(12) United States Patent
Tominaga et al.

(10) Patent No.: US 6,539,433 B1
(45) Date of Patent: Mar. 25, 2003

(54) SYSTEM FOR DISTRIBUTING NATIVE PROGRAM CONVERTED FROM JAVA BYTECODE TO A SPECIFIED HOME APPLIANCE

(75) Inventors: Nobuki Tominaga, Kyoto (JP); Shusuke Haruna, Itami (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/407,924

(22) Filed: Sep. 29, 1999

(30) Foreign Application Priority Data

Sep. 30, 1998 (JP) ............................................. 10-278782

(51) Int. Cl.⁷ .............................................. G06F 15/16
(52) U.S. Cl. ...................................... 709/246; 709/202
(58) Field of Search ................................. 709/246, 202, 709/315, 223; 717/118, 148; 370/260; 219/495; 725/78; 700/83

(56) References Cited

U.S. PATENT DOCUMENTS

| 4,724,521 A | | 2/1988 | Carron et al. |
| 5,162,986 A | | 11/1992 | Graber et al. |
| 6,044,218 A | * | 3/2000 | Faustini ........................ 709/315 |
| 6,121,593 A | * | 9/2000 | Mansbery et al. .......... 219/495 |
| 6,139,177 A | * | 10/2000 | Venkatraman et al. ......... 700/83 |
| 6,170,015 B1 | * | 1/2001 | Lavian ........................ 709/223 |
| 6,199,136 B1 | * | 3/2001 | Shteyn ........................ 370/260 |
| 6,282,698 B1 | * | 8/2001 | Baker et al. ................. 717/118 |
| 6,282,714 B1 | * | 8/2001 | Ghori et al. .................. 725/78 |
| 6,289,506 B1 | * | 9/2001 | Kwong et al. .............. 717/148 |

FOREIGN PATENT DOCUMENTS

| EP | 727862 | 8/1996 |
| EP | 841616 | 5/1998 |

OTHER PUBLICATIONS

K Virtual Machine (KVM) Home Page, Oct. 22, 1999, pp. 1–3.

* cited by examiner

Primary Examiner—Le Hien Luu

(57) ABSTRACT

Java bytecode for having home appliances perform a cooperative operation is developed by a development computer and is sent via a communications satellite from the development computer to a TV tuner&home server provided in a home. After the TV tuner&home server receives the Java bytecode, a bytecode converting unit of the TV tuner&home server determines which home appliance is the target appliance of the Java bytecode and converts the Java bytecode into native code for the microprocessor provided in the target appliance. The native code is downloaded into the target appliance via a home appliance network and the target appliance executes the downloaded native code.

14 Claims, 17 Drawing Sheets

SYSTEM FOR DISTRIBUTING NATIVE PROGRAM CONVERTED FROM JAVA BYTECODE TO A SPECIFIED HOME APPLIANCE

This application is based on application No. H10-278782 filed in Japan, the content of which is hereby incorporated by reference.

BACKGROUND OF THE INVENTION

1. Field of the Invention

The present invention relates to a program cooperative execution apparatus that has electrical appliances cooperatively perform specific operations by transferring programs to the electrical appliances via communication networks. More particularly, the present invention relates to a program cooperative execution apparatus for achieving cooperative operations among electrical appliances, such as home appliances, which each include a microprocessor having a relatively low throughput and a real memory having a relatively small capacity.

2. Background Art

There are cases where it is desirable to achieve cooperative operations among a plurality of electrical appliances that operate under the controls of their microprocessors. For instance, as broadcast stations start providing additional information, such as program schedules, in digital broadcasts, it becomes desirable for the broadcast stations to update the control programs stored in non-volatile memories of TV tuners provided in homes. Also, it is desirable for utilities, such as electric-power companies, gas companies, and hospitals, to offer new elaborate services by collecting information about the operational conditions of home appliances provided in homes via large-scale networks, such as WANs (Wide Area Networks).

One conceivable method for achieving cooperative operations among electrical appliances, such as home appliances, would be to develop new programs for achieving such cooperative operations and to download the programs into the electrical appliances which then execute the downloaded programs. However, the electrical appliances into which the programs are downloaded are not always designed using the same architecture. That is, the electrical appliances include totally different hardware or different types of microprocessors. Therefore, techniques for overcoming the differences in their architectures are required.

Virtual machines, typified by Java (TM) of JavaSoft (a division of Sun Microsystems Inc.), have been used as a technique for overcoming differences in architecture among computers connected via networks, such as the Internet. Virtual machines are programs executed on specific microprocessors (also called "real machines") and function as virtual microprocessors that sequentially interpret and execute dedicated operation codes (bytecodes) for the virtual machines. Note that a more detailed explanation of the Java is given in "The Java Virtual Machine Specification" (Tim Lindholm and Frank Yellin, pub. Addison Wesley) and in the Web page at "http://java.sun.com".

FIG. 1 shows a conventional computer network for having different types of computers perform cooperative operations by providing the computers with common programs that can be executed by virtual machines of the computers. An application program 130 for achieving a cooperative operation is written on a development computer 100 in the Java language and is converted into Java bytecode 131a by a Java compiler 101. The Java bytecode 131a is sent to another computer 120 whose architecture is different from that of the development computer 100 via a network adaptor 102, a network 110, and a network adaptor 123. The sent bytecode 131c is interpreted and is executed by a Java virtual machine 121 that operates on a real machine 122 of the computer 120. In this manner, common programs (Java bytecodes) can be executed as they are by computers having different architectures through the intermediary operations of Java virtual machines.

Cooperative operation systems that involve home appliances can be realized by providing Java virtual machines used in computer networks in the home appliances. First, Java virtual machines are implemented into all home appliances that need to perform cooperative operations. Java bytecodes are provided to the home appliances from other apparatuses via a communications satellite, a network constructed in the home, or the like, and the downloaded Java bytecodes are executed by the Java virtual machines in the home appliances.

However, when Java virtual machines are applied to home appliances as they are, there are the following problems concerning the execution speed of programs and the memory capacities of the home appliances.

Virtual machines are a technique for realizing the functions of microprocessors and OSs (Operating Systems) using hierarchical software. Therefore, the execution of Java bytecode by a virtual machine generally takes much longer time than the execution of a program composed of native code that can be directly executed by an OS or real machine. This may not be significant for computers provided with high-throughput microprocessors, such as INTEL x86, MOTOROLA POWER PC, and SUN SPARC, but constitutes a significant problem for home appliances that include low-throughput microprocessors due to various factors such as cost.

Also, Java bytecode is designed with the assumption that it will be delivered via an open network (i.e., a network which is not limited to specific users or any particular purpose), such as the Internet, and so may be executed in various environments. Therefore, Java bytecode is much larger than a general program that has the same content as the Java bytecode. Consequently, devices that execute Java bytecode require real memories with large capacities.

In more detail, Java bytecode has a structure where functions and variables are cross-referenced using a name area called a constant pool. This structure allows Java bytecode to safely run without obstructing other applications written by other programmers. That is, the name area is used to prevent the Java bytecode from obstructing other applications and operations of systems. The name area is generally at least as large as twice the code body of the Java bytecode. While this may not matter for computers that are equipped with at least 16MB of RAM, it is a significant program for home appliances where memory capacities needs to be limited due to various factors such as cost.

SUMMARY OF THE INVENTION

In view of the stated problems, the object of the present invention is to provide a program cooperative execution apparatus that can also be applied to electrical appliances, such as home appliances, which each include a microprocessor having a low throughput and a real memory having a small capacity. That is, the object of the present invention is to provide a program cooperative execution apparatus that realizes cooperative operations among various types of electrical appliances by sending architecture-independent programs to the electrical appliances.

The stated object is achieved by the program cooperative execution apparatus for having a plurality of electrical appliances perform cooperative operations specified by programs sent from a transmitting device, each of the plurality of electrical appliances being provided with a processor, the apparatus being connected to the transmitting device via a first communication channel and being connected to the plurality of electrical appliances via a second communication channel, the program cooperative execution apparatus including: a receiving unit for receiving a first bytecode for a first virtual machine, the first bytecode being a program sent from the transmitting device via the first communication channel and specifying a cooperative operation; an appliance specifying unit for specifying an electrical appliance that should execute the received first bytecode, out of the plurality of electrical appliances; a converting unit for converting the received first bytecode into program code for a processor provided in the specified electrical appliance; and a distributing unit for distributing the program code generated by the converting unit to the specified electrical appliance via the second communication channel. With this construction, the program cooperative execution apparatus of the present invention not only, functions as a relay center of the program sent from the transmitting apparatus but also converts the sent program into a program code for a target electrical appliance and transfers the program code to the target electrical appliance. Therefore, the program cooperative execution apparatus of the present invention can also be applied to electrical appliances, such as home appliances, which each include a microprocessor having a low throughput and a real memory having a small capacity.

Here, the processor provided in each of the plurality of electrical appliances may be a real machine, the converting unit may convert the received first bytecode into native code of a real machine provided in the specified electrical appliance, and the distributing unit may distribute the native code generated by the converting unit to the specified electrical appliance via the second communication channel. With this construction, it is enough for target electrical appliances to have a capability for executing their native codes. Therefore, the electrical appliances do not need to include virtual machines which are each a large program.

Here, the receiving unit may receive header information together with the first bytecode, the header information relating to a destination of the received first bytecode, and the appliance specifying unit may specify the electrical appliance according to the header information. With this construction, the header information sent from the transmitting apparatus specifies a target electrical appliance that needs to perform a cooperative operation. As a result, the transmitting apparatus can specify the target electrical appliance with reliability.

Here, the converting unit may include: a plurality of conversion tables which each correspond to one of the plurality of electrical appliances, each conversion table showing which instructions in native codes of a real machine of a corresponding electrical appliance correspond to each instruction in first bytecodes; and a code converting unit for converting the received first bytecode into the native code of the real machine provided in the specified electrical appliance by referring to a conversion table corresponding to the specified electrical appliance. Each conversion table to corresponding to one of the plurality of electrical appliances shows correspondence between first bytecodes and native codes of the microprocessor of the electrical appliance. Because first bytecodes are converted into native codes only by referring to the conversion table, the conversion processing can be performed at high speed and the maintenance of the conversion table, such as the update of the conversion table and the addition of a new table, can be performed without difficulty.

Here, the processor provided in each of the plurality of electrical appliances may be a second virtual machine, the converting unit may convert the received first bytecode into a second bytecode for a second virtual machine provided in the specified electrical appliance, and the distributing unit may distribute the second bytecode generated by the converting unit to the specified electrical appliance via the second communication channel. With this construction, even though a target electronic appliance includes a virtual machine that is different from the first virtual machine for which the first bytecode is designed, the target electronic appliance performs the same operation as the case where the first bytecode is executed by the first virtual machine. Therefore, a program cooperative execution apparatus that is suitable for electrical appliances, such as home appliances, which include low-throughput microprocessors and memories with small capacities are realized by designing new virtual machines which can be executed by the electrical appliances.

Here, each first bytecode for the first virtual machine may include additional information that is used to dynamically link a plurality of program modules included in the first bytecode, and the converting unit may generate the second bytecode by linking the plurality of program modules according to the additional information included in the received first bytecode, where the second bytecode does not include the additional information. With this construction, the second bytecode downloaded into a target electrical appliance does not include lengthy link information, such as a constant pool, that is added to conventional Java bytecode. Therefore, it is enough for the target electrical appliance to include a memory having a relatively small capacity and a small virtual machine that does not include a dynamic link function.

Here, the first communication channel may be an open network that is open to any users, and the second communication channel may be a closed network that is limited to specific users who meet a certain condition. With this construction, the secure delivery of programs via the second channel does not need to be strictly ensured, in comparison with the program delivery via the first channel. Therefore, the second channel is suitable for the transfer of bytecodes whose sizes are reduced. Accordingly, it is enough for each electrical appliance to include a small virtual machine that only has basic functions and a real memory with a relatively small capacity. As a result, a program cooperative execution apparatus that is suitable for home appliances which each have a low-throughput microprocessor and a real memory having a small capacity is realized by connecting the home appliances to a closed network, such as a home appliance network.

As described above, the program cooperative execution apparatus of the present invention realizes cooperative operations among electrical appliances provided with low-throughput CPUs as well as among high-performance computers, such as work stations and personal computers, by transferring common programs (Java bytecodes) to the electrical appliances. Because the program cooperative execution apparatus of the present invention allows program resources to be easily shared by electrical appliances, the present invention has great practical uses.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Embodiments of the present invention are described below with reference to the drawings.

First Embodiment

The first embodiment relates to a program cooperative execution system that is suitable for realizing cooperative operations among relatively low-priced home appliances.

Figure 2:
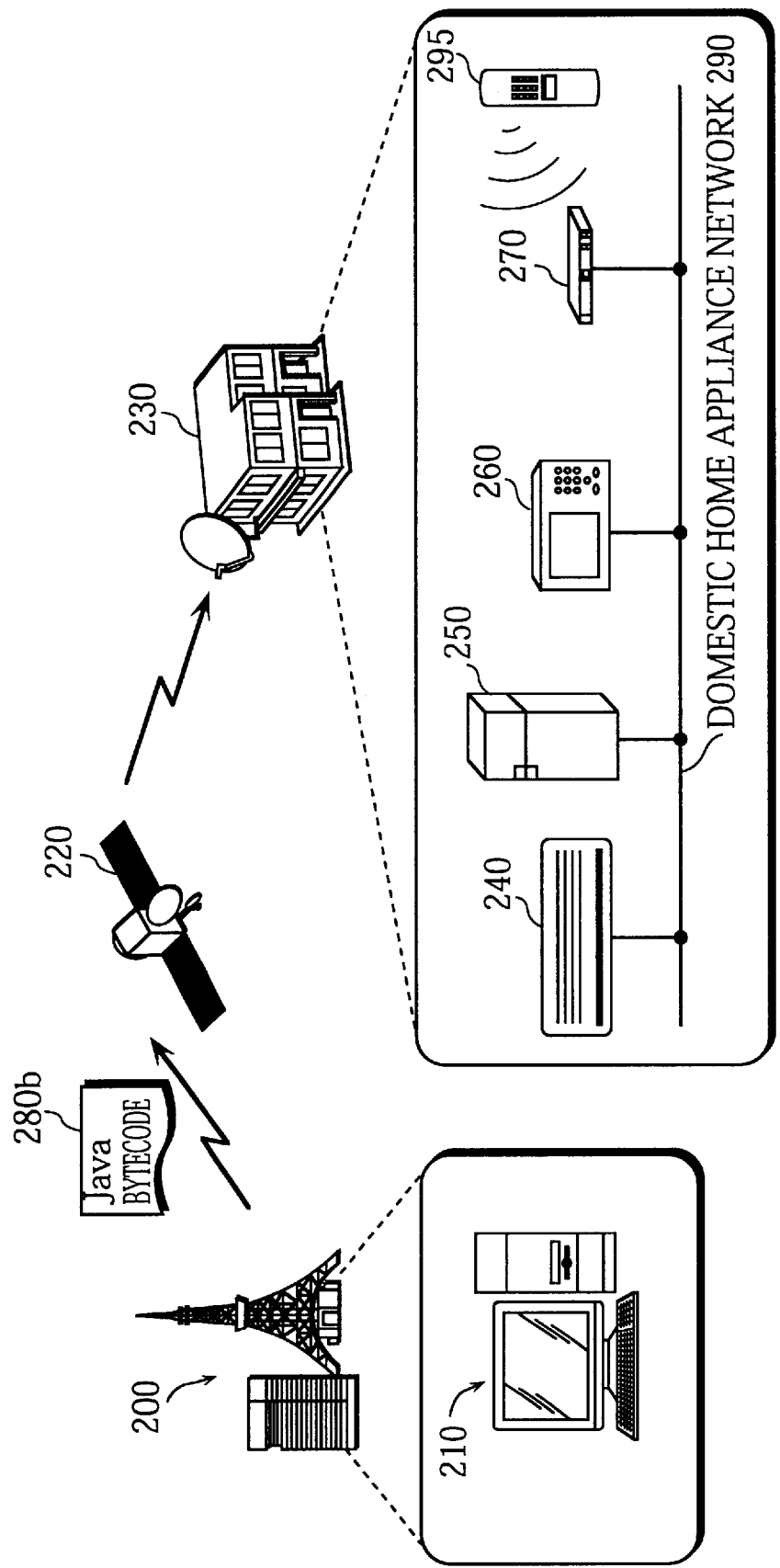
FIG. 2 is a block diagram showing the construction of the program cooperation execution system of the first embodiment.

FIG. 2 is a block diagram showing the construction of the program cooperative execution system of the present embodiment. The present system includes a development computer 210 that is provided in a company (a base station) 200 and is used to develop application programs that have various devices perform cooperative operations, a communications satellite 220 for delivering the application programs to a home 230 through wireless communication, and home appliances that are provided in the home 230 and perform cooperative operations (an air conditioner 240, a refrigerator 250, a microwave oven 260, a TV tuner&home server 270, and a remote controller 295). A home bus system (HBS) is constructed of the home appliances that are connected to one another via a domestic home appliance network 290. The transmission media of the domestic home appliance network 290 are power cables and infrared rays.

Figure 3A:
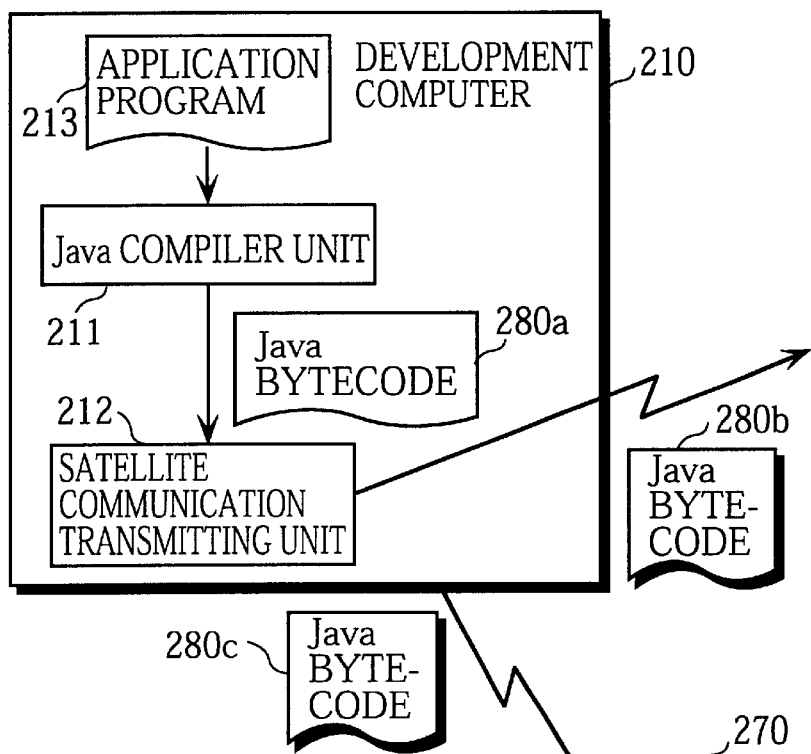
FIG. 3A is a functional block diagram of the development computer shown in FIG. 2.
Figure 3B:
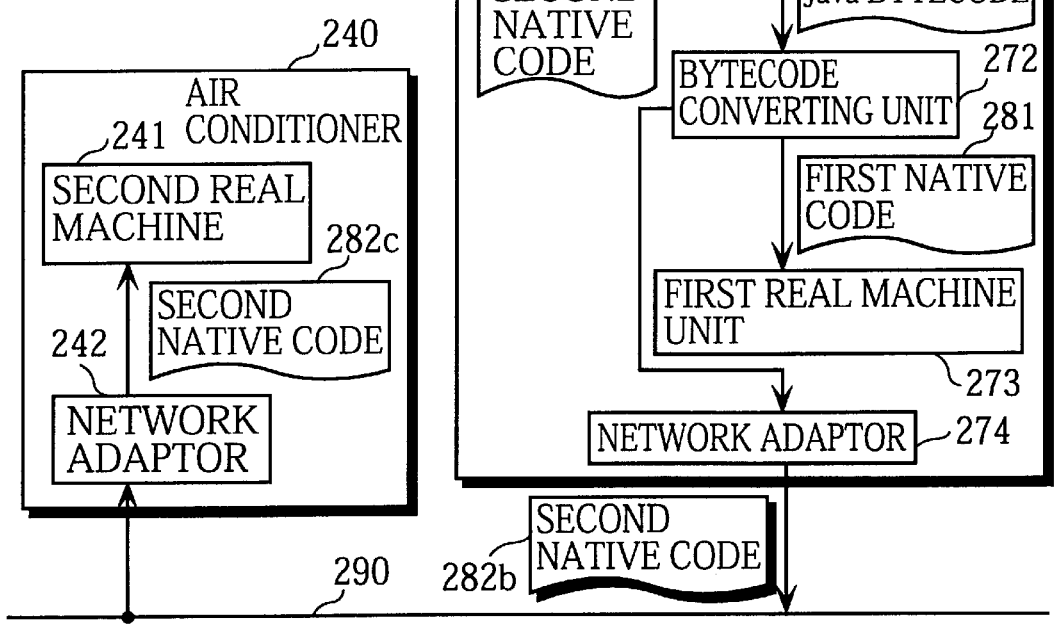
FIG. 3B is a functional block diagram of home appliances (air conditioner and TV tuner&home server) provided in the home shown in FIG. 2.

FIG. 3A is a functional block diagram of the development computer 210 shown in FIG. 2. FIG. 3B is a functional block diagram of the home appliances provided in the home 230 (the air conditioner 240 and the TV tuner&home server 270 are shown in this drawing). Note that these block diagrams only show the functions related to program cooperative executions, and so do not show the standard functions and components of a computer or a home appliance. Accordingly, the microwave oven 260 and the remote controller 295 each have the same construction as the air conditioner 240 shown in FIG. 3B.

The development computer 210 generates Java bytecodes for having the home appliances perform cooperative operations and delivers the generated Java bytecodes to the home appliances. To do so, the development computer 210 includes a Java compiler unit 211 for converting an application program 213 written in the Java language into Java bytecode 280a in a delivery form, and a satellite communication transmitting unit 212 for transmitting the Java bytecode 280a to the home 230 via the communications satellite 220. This development computer 210 has the same basic functions as the conventional Java development computer 100 shown in FIG. 1. However, the Java bytecode 280b delivered from the development computer 210 additionally includes information showing the home appliance that is the target of the Java bytecode 280b (hereinafter simply referred to as the "target appliance"). This information is originally given in the application program 213.

Figure 4:
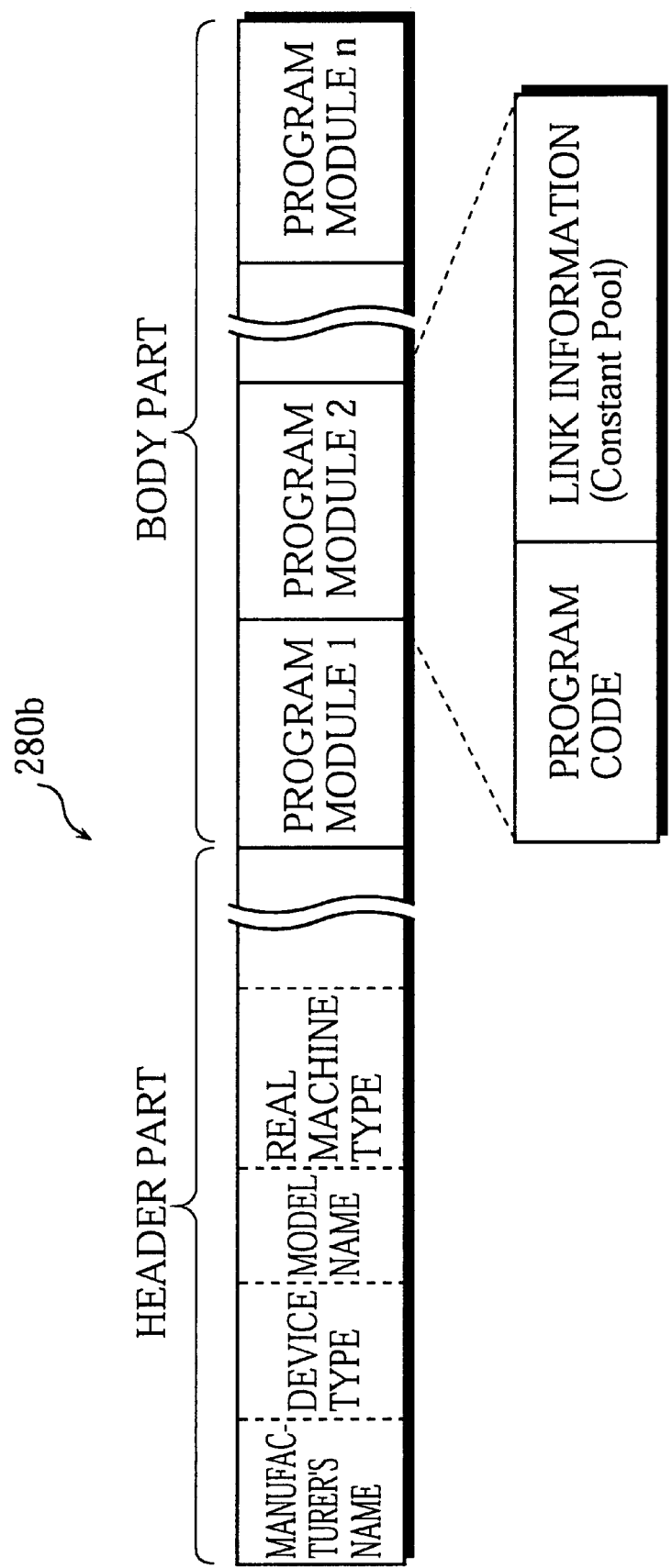
FIG. 4 shows the data structure of the Java bytecode sent from the development computer to each home.

FIG. 4 shows the data structure of the Java bytecode 280b that is sent from the development computer 210 to the home 230. The Java bytecode 280b includes a header part that contains information about the target appliance and a body part that contains a plurality of program modules for having the target appliance perform a cooperative operation. Each program module in the body part includes program code that contains bytecodes (instructions) and a constant pool that contains information (link information) as to the dynamic link with other program modules.

The TV tuner&home server 270 functions as a TV tuner for receiving digital broadcasts from the communications satellite 220 and outputting video signals to a television. The TV tuner&home server 270 also functions as a home server that forms the heart of the present system. That is, the TV tuner&home server 270 has a function for having home appliances connected to the domestic home appliance network 290 perform cooperative operations. The TV tuner&home server 270 includes a satellite communication receiving unit 271, a bytecode converting unit 272, the first real machine unit 273, and a network adaptor 274.

The satellite communication receiving unit 271 receives Java bytecode 280c and outputs the Java bytecode 280c to the bytecode converting unit 272.

The bytecode converting unit 272 is the most characteristic element of the present system. The bytecode converting unit 272 converts Java bytecode 280d transferred from the satellite communication receiving unit 271 into the native code of the real machine included in the target appliance, and transfers the native code to the target appliance. That is, according to the information in the header part of the Java bytecode 280d, the bytecode converting unit 272 converts the Java bytecode 280d into native code, and stores the native code into the program storage of the first real machine unit 273 or transfers the native code to the target appliance via the network adaptor 274.

The first real machine unit 273 is a generic name for hardware and firmware that include a specialized microprocessor for controlling the TV tuner&home server 270, a memory that includes a temporary work area and a program storage area for storing programs to be executed by the TV tuner&home server, and a system library (the collection of basic programs for controlling hardware).

The network adaptor 274 is an interface card that connects the TV tuner&home server 270 to the domestic home appliance network 290. In accordance with directions from the bytecode converting unit 272, the network adaptor 274 transfers the native code 282a sent from the bytecode converting unit 272 to the target home appliance.

The air conditioner 240 is a home appliance for controlling room temperature and includes a second real machine 241 and a network adaptor 242.

The second real machine unit 241 is a generic name for hardware and firmware that include a specialized microprocessor for controlling the air conditioner, a memory that includes a temporary work area and a program storage area for storing programs to be executed by the air conditioner, and a system library (the collection of basic programs for controlling hardware).

The network adaptor 242 is an interface card that connects the air conditioner 240 to the domestic network 290. The network adaptor 242 receives the native code 282a sent from the TV tuner&home server 270 and stores the native code 282a in the program storage area of the second real machine unit 241.

Figure 5:
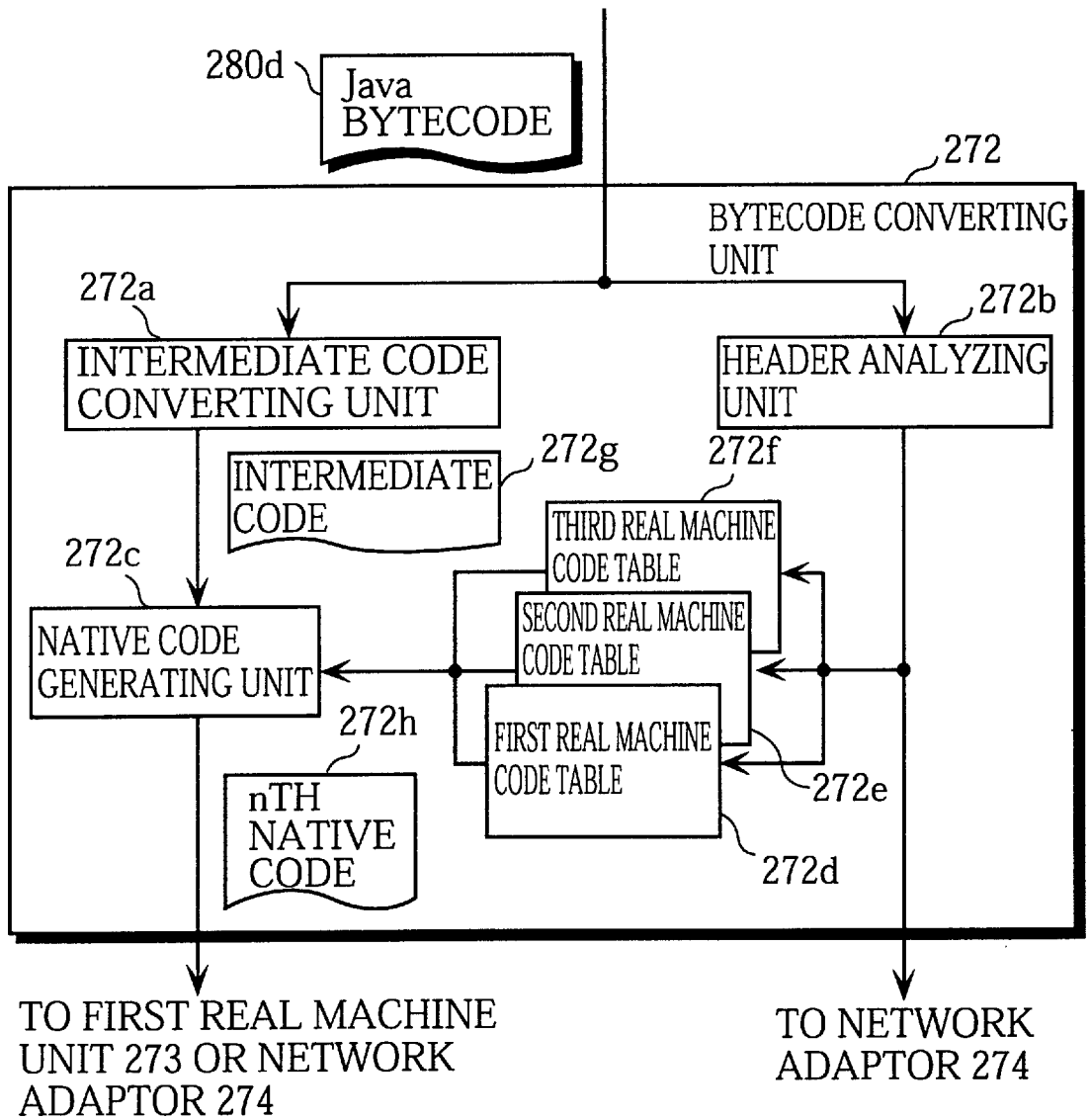
FIG. 5 is a functional block diagram showing the detailed construction of the bytecode converting unit shown in FIG. 3.

FIG. 5 is a functional block diagram that shows the detailed construction of the bytecode conversion unit 272 shown in FIG. 3. The bytecode conversion unit 272 can be broadly divided into an analyzing part and a language processing part. The analyzing part includes a header analyzing unit 272b and the language processing part includes an intermediate code converting unit 272a, a native code generating unit 272c, and three real machine code tables 272d–272f. The language processing part converts the Java bytecode 280d into the native code of the real machine of a target appliance specified by the header part.

The header analyzing unit 272b determines which one of the real machine code tables 272d–272f corresponds to a target appliance by referring to the real machine type contained in the header part of the Java bytecode 280d. At the same time, the header analyzing unit 272b determines which home appliance is the target appliance by referring to the manufacturer's name, the device type, and the model name that are also contained in the header part. When the target appliance is a home appliance other than the TV tuner&home server 270, the header analyzing unit 272b also controls the network adapter 274 so that the native code generated by the bytecode converting unit 272 is transferred to the target appliance.

When the TV tuner&home server and the first real machine are specified by the header part of the Java bytecode 280b, for instance, the header analyzing unit 272b selects the first real machine code table 272d, and informs the native code generating unit 272c that the first real machine code table 272d is selected. On the other hand, when the air conditioner 240 and the second real machine are specified by the header part of the Java bytecode 280b, the header analyzing unit 272b selects the second real machine code table 272e and informs the native code generating unit 272c that the second real machine code table 272e is selected. In this case, the header analyzing unit 272b also controls the network adaptor 274 so that the native code 272h generated by the native code generating unit 272c is transferred to the air conditioner 240.

The intermediate code converting unit 272a is the same as the intermediate code converting unit of a general cross assembler. The intermediate code converting unit 272a generates intermediate code 272g by lexically analyzing the Java bytecode 280d, converting the Java bytecode 280d into an internal representation in a binary tree form, and performing optimization and the allocation of resources.

The native code generating unit 272c is the same as the object code generating unit of a general cross assembler. The native code generating unit 272c converts the intermediate code 272g generated by the intermediate code converting unit 272a into native code for the target appliance by referring to the real machine code table specified by the header analyzing unit 272b.

Each of the real machine code tables 272d–272f is a memory in which correspondence between all types of intermediate codes and native codes for the corresponding real machine is stored. More specifically, the real machine code table 272d is a memory in which correspondence between intermediate codes and native codes for the first real machine 273 of the TV tuner&home server 270 is stored, the real machine code table 272e is a memory in which correspondence between intermediate codes and native codes for the second real machine 241 of the air conditioner 240 and the refrigerator 250 is stored, and the real machine code table 272f is a memory in which correspondence between intermediate codes and native codes for the third real machine of the microwave oven 260 and the remote controller 295 is stored.

The following description concerns the operation of the present program cooperative execution system having the stated construction.

Figure 6:
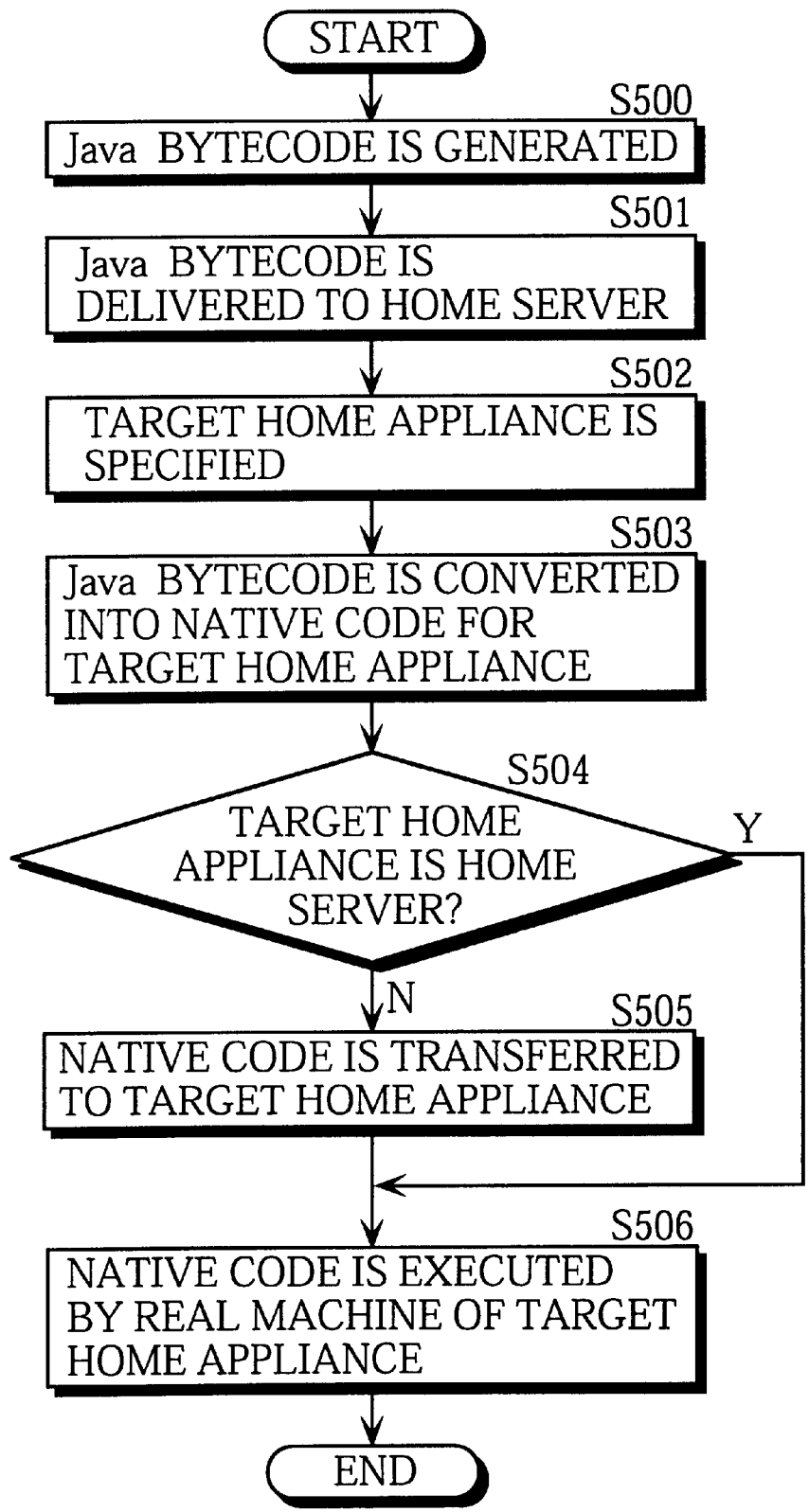
FIG. 6 is a flowchart showing the operation procedure of the program cooperation execution system of the first embodiment.

FIG. 6 is a flowchart showing the operation procedure of the present system. The air conditioner 240 is the target appliance of this example.

First, the application program 213 written in the Java language for having the target appliance perform a cooperative operation is developed by the development computer 210 and is converted into the Java bytecode 280a by the Java compiler 211 (step S500). In this example, the application program 213 is executed by the air conditioner 240 and realizes a function of calculating the total energization period of the air conditioner 240.

The Java bytecode 280a is delivered to the home 230 via the satellite communication transmitting unit 212 of the development computer, the communications satellite 220, and an antenna. In the home 230, the delivered Java bytecode 280c is transferred to the bytecode converting unit 272 via the satellite communication receiving unit 271 (step S501).

In the bytecode converting unit 272, the header analyzing unit 272b analyzes the header part of the transferred Java bytecode 280d and finds that the air conditioner 240 is the target appliance (step S502). At the same time, the intermediate code converting unit 272a converts the Java bytecode 280d into the intermediate code 272g. Then, the native code generating unit 272c converts the intermediate code 272g into the native code 272h for the air conditioner 240 by referring to the second real machine code table 272e of the air conditioner 240 (step S503).

The native code 272h is transferred to the air conditioner 240 via the network adaptor 274, the domestic home appliance network 290, and the network adaptor 242 according to the analysis result of the header analyzing unit 272b (steps S504 and S505). Then, the native code 272h is stored in the program storage area of the second real machine unit 241 and is executed by the microprocessor of the second real machine unit 241 (step S506) Here, if the header analyzing unit 272b finds that the target appliance of the Java bytecode 280b delivered from the development computer 210 is the TV tuner&home server 270 by referring to the header part of the Java bytecode 272b (step S502), the native code generating unit 272c generates the native code 272h for the first real machine unit 273 (step S503). The native code 272h is stored in the program storage area of the first real machine unit 273 and is executed by the microprocessor of the first real machine 273 (step S506).

In this manner, the TV tuner&home server converts the Java bytecode 280a generated by the development computer 210 into native code for a target appliance. The native code is downloaded into the target appliance and is directly executed by the microprocessor of the target appliance.

In this example, in the Java bytecode 280a delivered from the development computer 210 to the TV tuner&home server 270, the header part contains information (such as a device type) specifying the air conditioner 240 and the body part contains a program for having the air conditioner 240 calculate its total energization period. Therefore, the native code 282c obtained by converting the Java bytecode 280a is transferred from the TV tuner&home server to the air conditioner 240 and is executed by the second real machine unit 241 of the air conditioner 240.

As a result, the control program in the air conditioner 240 is updated and the air conditioner 240 obtains a new function of calculating its total energization period. From then on, during operation, the air conditioner 240 measures the current energization period, adds the current energization period to the previous total, and stores the addition result in an internal memory. Under the user's instructions, the air conditioner 240 may display the total energization period stored in the internal memory on a liquid crystal panel of the air conditioner 240 or sends the total energization period to the development computer 210 via the domestic home appliance network 290 and a telephone connected to the domestic home appliance network 290. In this manner, the total energization period of the air conditioner provided in each home is transferred to the development computer 210 and is used to judge whether individual air conditioners are due for a maintenance inspection.

Figure 7:
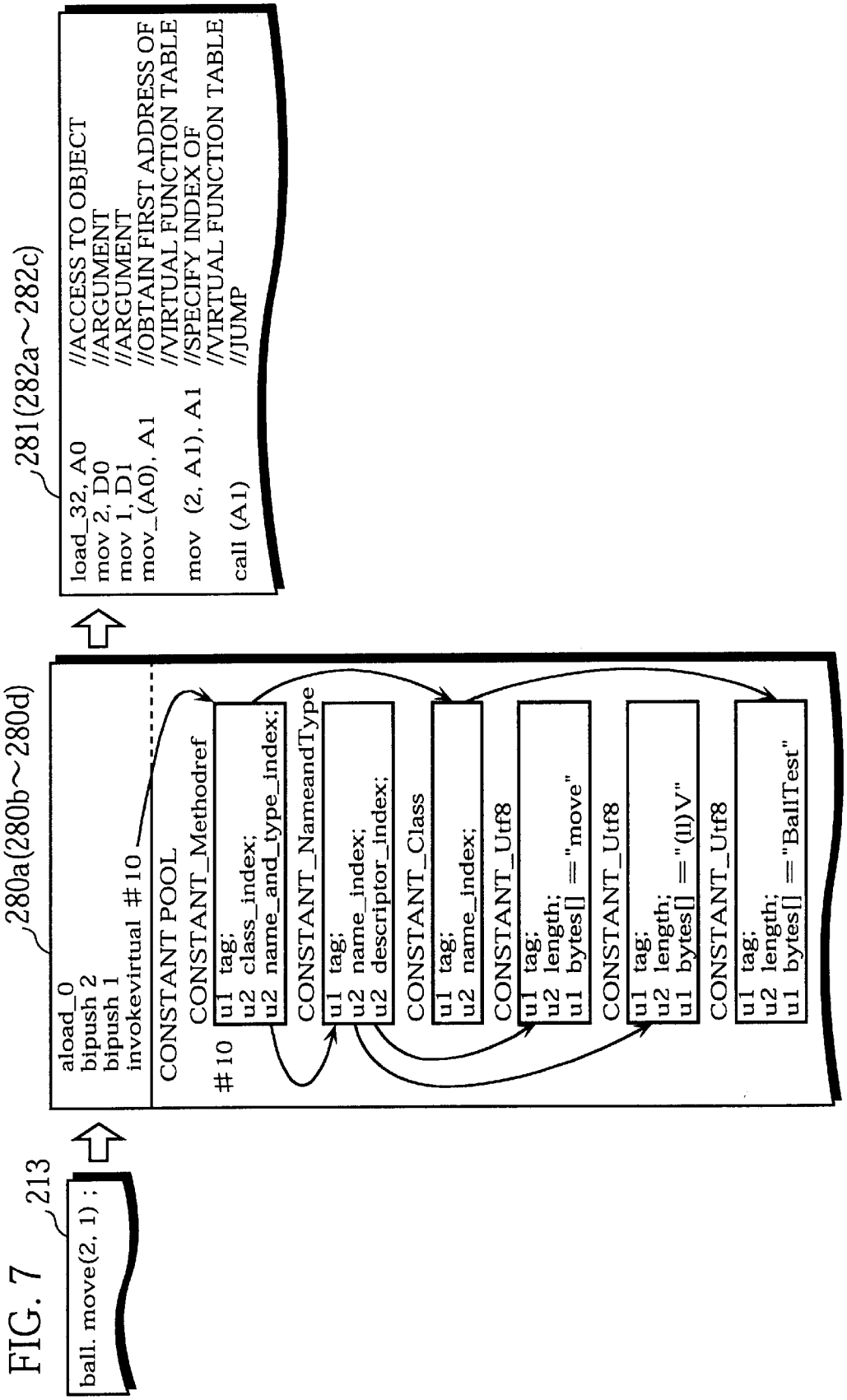
FIG. 7 shows example lists of an application program, bytecode, and native code.

FIG. 7 shows actual examples of program lists of the application program 213, the bytecode 280a (280b–280d), and the native code 281 (282a–282c). This drawing only shows parts with the same processing contents.

The application program 213 shown at the left of this drawing is written in the Java language, and is an instruction for calling a virtual function "ball.move(2, 1)".

The Java bytecode 280a shown at the center of this drawing has the same contents as the application program 213 and includes four lines of program code and a constant pool composed of six data blocks. Arrows which indicate the targets of pointers are also shown in this drawing.

The program code in this drawing includes a 1-byte instruction "aload_0" for preparing for a virtual function call, two 3-byte instructions "bipush" for passing arguments, and a 3-byte instruction "invokevirtual" for calling the virtual function. Therefore, the total size of this program code is ten bytes. The total size of the six data blocks included in the constant pool is 39 bytes, as can be understood from type declarations "un" (unsigned n bytes) and the character string length of each block. Therefore, the total size of the Java bytecode 280a is 49 bytes.

The native code 281 shown at the right of FIG. 7 is generated by the bytecode converting unit 272 of the TV tuner&home server 270 to which the Java bytecode 280a is delivered via the communications satellite 220. This native code 281 includes six machine instructions. If the size of each machine instruction is two bytes, the total size of the native code 281 is 12 bytes.

The lengthy Java bytecode 280a in a delivery form is delivered to the home 230, the TV tuner&home server 270 converts the Java bytecode 280a into the small native code 281 (282a–282c) by eliminating redundancies in the Java bytecode 280a, and the native code 281 (282a–282c ) is downloaded into and executed by a target appliance provided in the home 230.

With the present system, each home appliance connected to the domestic home appliance network effectively executes the Java bytecode delivered from the development computer 210 without using a specialized Java virtual machine. That is, by including the bytecode converting unit, the present program cooperative execution system can have different types of electrical appliances which each only include a low-throughput microprocessor and a limited memory perform cooperative operations by delivering to the electrical appliances Java bytecodes that are a de facto standard for delivering programs.

It should be noted here that in the present embodiment, the bytecode converting unit 272 converts the inputted Java bytecode 280d into intermediate code and then coverts the intermediate code into native code. However, the present invention is not limited to this procedure and the bytecode converting unit 272 may directly convert the inputted Java bytecode into native code. In this case, the real machine code tables 272d–272f give the correspondence between Java bytecodes and native codes, instead of the correspondence between intermediate codes and native codes.

Second Embodiment

The second embodiment relates to a program cooperative execution system that is suitable for having high-performance home appliances perform cooperative operations. That is, the home appliances of the present embodiment include high-throughput microprocessors and real memories having large capacities, in comparison with those of the first embodiment.

Figure 8:
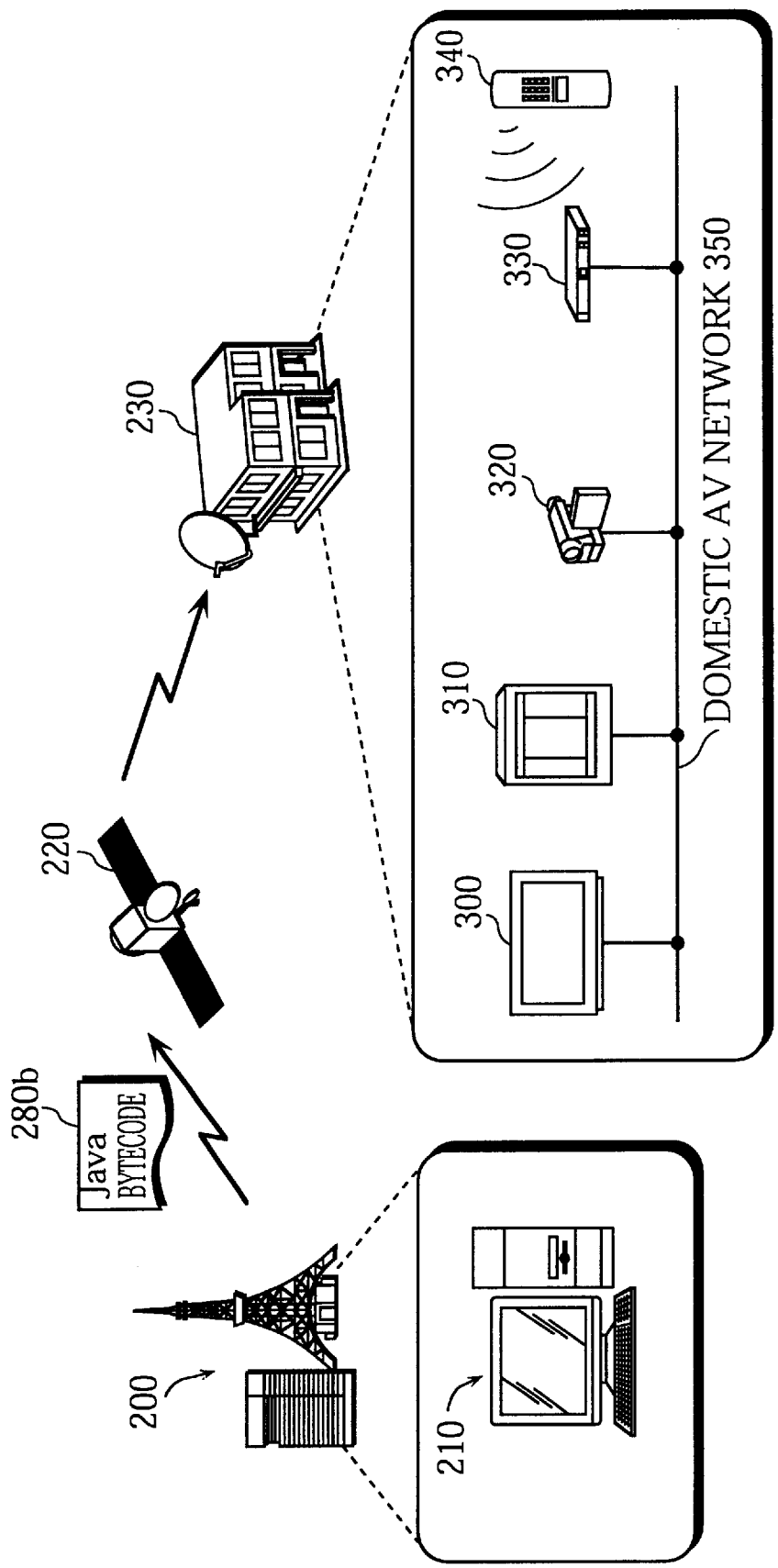
FIG. 8 is a block diagram showing the construction of the program cooperative execution system of the second embodiment.

FIG. 8 is a block diagram showing the construction of the program cooperative execution system of the second embodiment. The present system is the same as that of the first embodiment in that cooperative operations between the development computer 210 and home appliances and cooperative operations between home appliances are realized. To realize such cooperative operations, an application program (the Java bytecode 280d) is developed by the development computer 210 provided in the company 200, is delivered to the home 230 via the,communications satellite 220, and is downloaded into and is executed by a target appliance. The difference between the program cooperative execution systems of the first and second embodiments is that the home appliances of the present embodiment are a digital TV 300, a DVD server 310, a digital video camera 320, a TV tuner&home server 330, and a remote controller 340. That is, the types and functions of the home appliances of the present embodiment are different from those of the home appliances of the first embodiment. Also, the present system includes a domestic AV network 350 instead of the domestic home appliance network 290. Note that in the following description, elements of the present embodiment that are the same as elements of the first embodiment are assigned the same numbers as in FIG. 2 and are not described.

The DVD server 310 is a drive apparatus for writing and reading digital data, such as motion data (MPEG2 data, for instance), onto and from a plurality of digital video discs (DVDs). The digital TV 300 is a television for decoding and reproducing motion data sent from the DVD server 310. The domestic AV (Audio Visual) network 350 is a bus based on the IEEE1394 standard. Each of these home appliances 300, 310, 320, and 330 is an AV-related appliance that includes a virtual machine designed for home appliances (hereinafter referred to as a "home appliance virtual machine").

Figure 9:
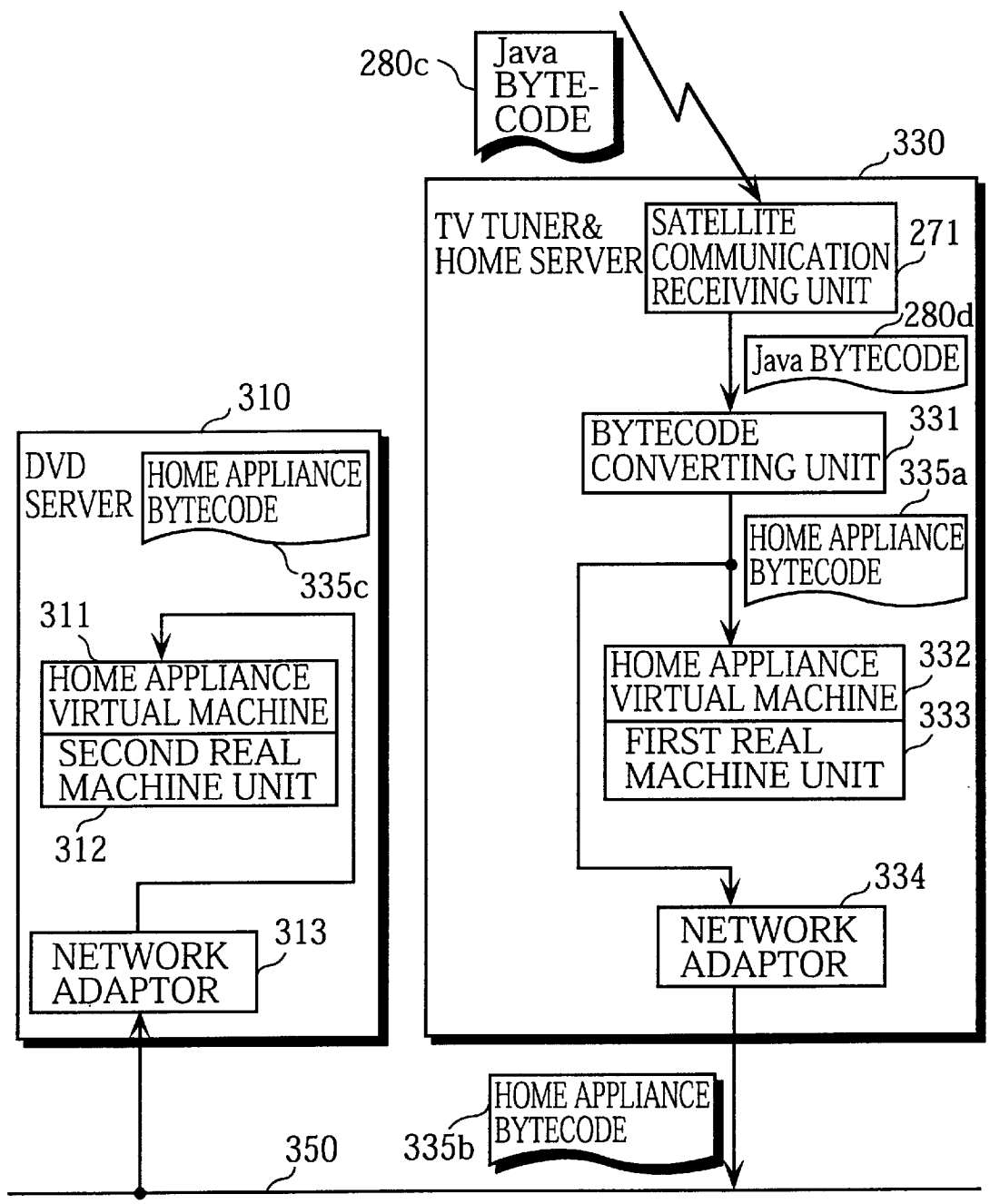
FIG. 9 is a functional block diagram showing the constructions of the home appliances (a DVD server and a TV tuner&home server) shown in FIG. 8.

FIG. 9 is a functional block diagram showing the constructions of the DVD server 310 and the TV tuner&home server 330. As can be seen by comparing this drawing with FIG. 3B, the present system differs from the system of the first embodiment in that the DVD server 310 includes the home appliance virtual machine 332 that operates on a real machine 333 of the DVD server 310, the TV tuner&home server 330 includes the home appliance virtual machine 311 that operates on a real machine 312 of the TV tuner&home server 330, and the TV tuner&home server 330 includes a bytecode converting unit 331 for converting the Java bytecode 280*d* sent from the satellite communication receiving unit 271 into a program (a home appliance bytecode 335*a*) that is specialized to the home appliance virtual machines 332 and 311.

Figure 10B:
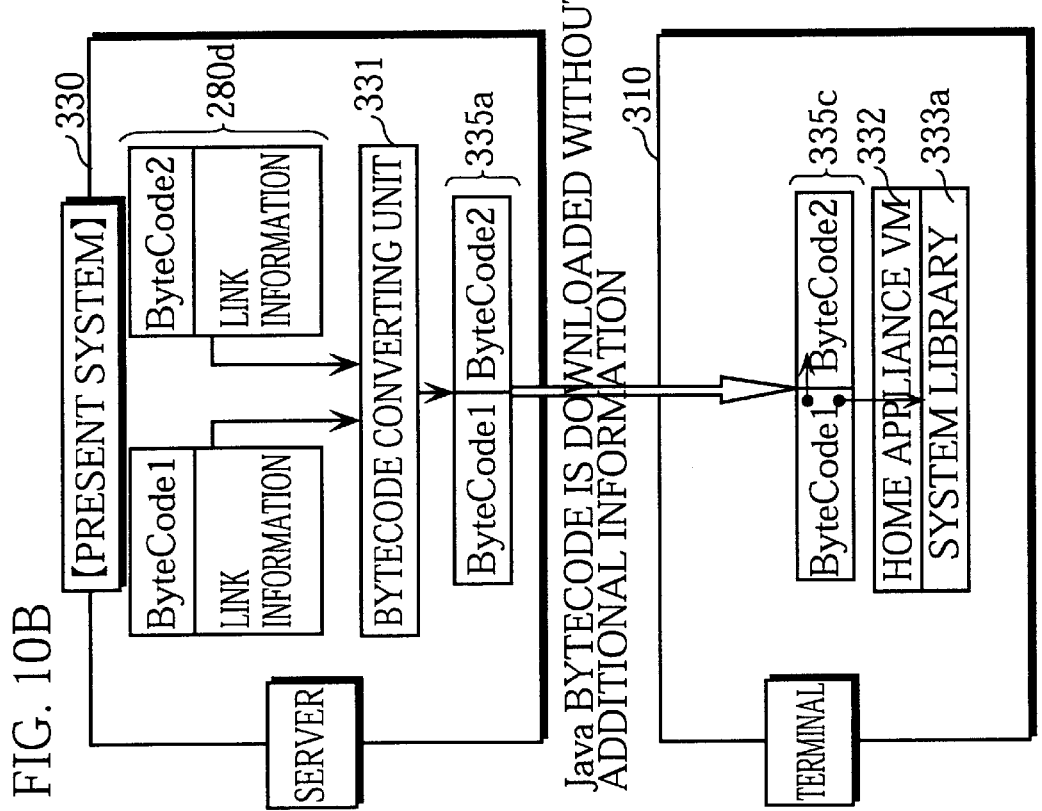
FIG. 10B shows the functional construction of the home appliance virtual machine of the present invention.
Figure 10A:
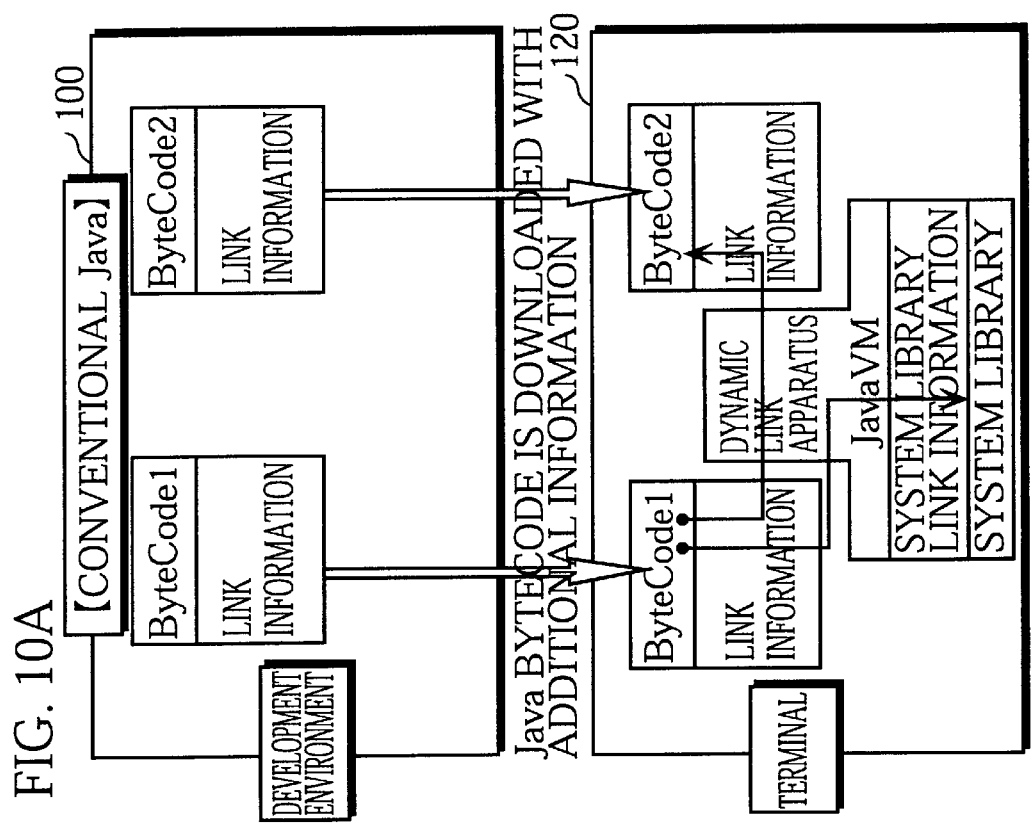
FIG. 10A shows the functional construction of a conventional virtual machine (a Java virtual machine)

FIG. 10A shows the functional construction and operation of a conventional virtual machine (a Java virtual to machine) and FIG. 10B shows the functional construction and operation of the home appliance virtual machine 332. These drawings also show the data handled by these virtual machines. The design concept of the home appliance virtual machines 332 and 311 is described below.

Figure 1:
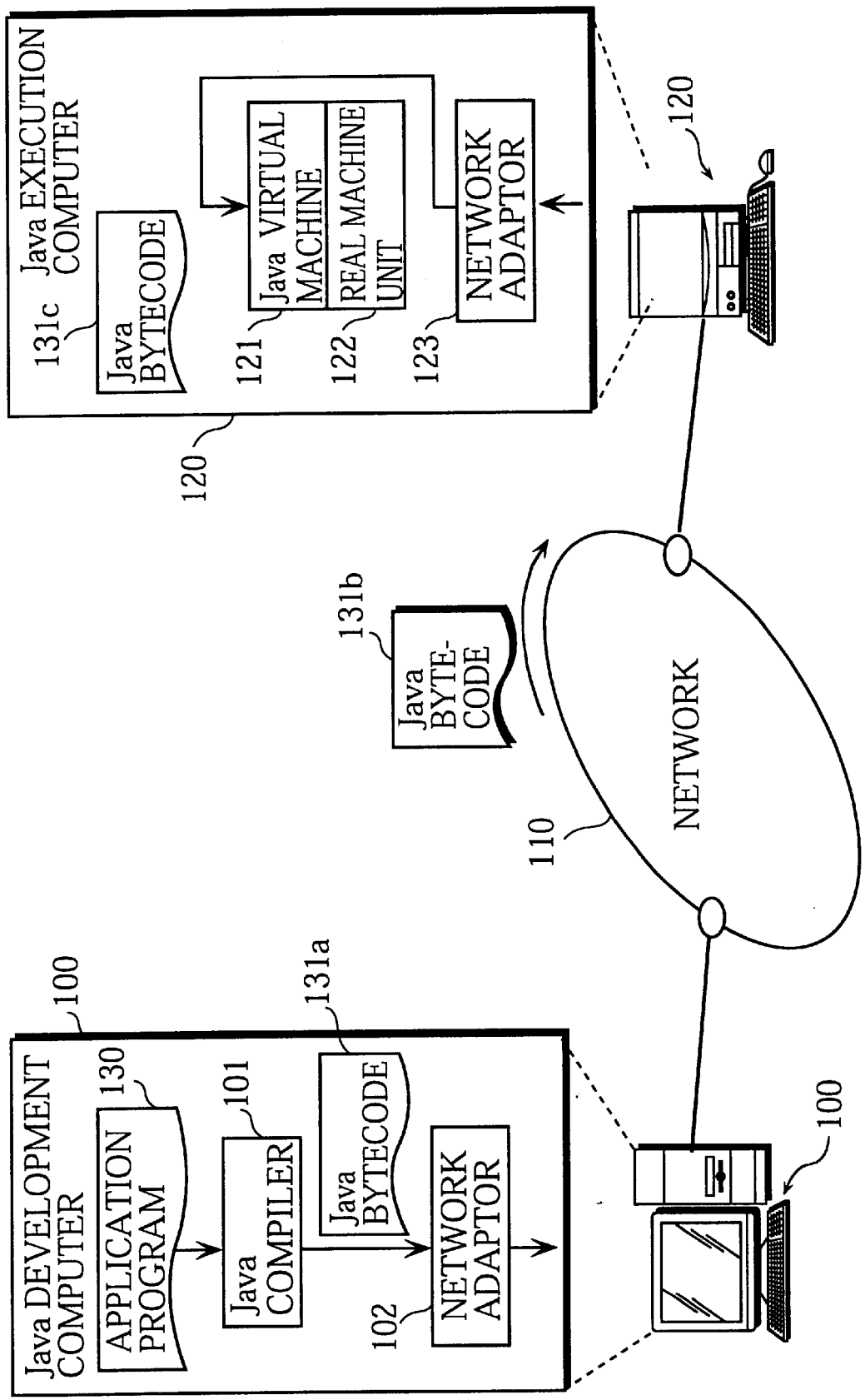
FIG. 1 is a block diagram showing the construction of a conventional program cooperation execution system.

FIG. 10A shows the internal construction of Java bytecode in the development computer 100 shown in FIG. 1. The internal constructions of the Java bytecode and the Java virtual machine in the target computer 120 are also shown in this drawing. Under the conventional technique, Java bytecode includes program modules (ByteCode 1 and ByteCode 2) which each contain link information in addition to program code. Java bytecode having this structure is delivered from the, development computer 100 to the target computer 120. Then, the target computer 120 resolves the reference relations between program modules and the system library dedicated to the target computer 120 using the dynamic link apparatus of the Java virtual machine of the target computer 120, while executing the Java bytecode.

FIG. 10B shows the internal constructions of the Java bytecode 280*d* and the home appliance bytecode 335*a* in the TV tuner&home server 330. FIG. 10B also shows the internal constructions of the home appliance bytecode 335*c* and the home appliance virtual machine 332 in the DVD server 310 to which bytecodes are delivered. In the present embodiment, the bytecode converting unit 331 converts the Java bytecode 280*d* into the home appliance bytecode 335*a* by deleting link information from each program module (ByteCode 1 and ByteCode 2) of the Java bytecode 280*d*. The home appliance bytecode 335*a*, which is smaller than the Java bytecode 280*d*, is transferred to the terminal (the DVD server 310) and is interpreted and executed by the home appliance virtual machine 332 running in the DVD server 310.

In the present embodiment, the link information is deleted from the Java bytecode 280*d* when it has become unnecessary, that is, when the Java bytecode 280*d* has passed through the open network where secure delivery of the Java bytecode need to be ensured. By doing so, the smaller bytecode that does not include link information can be executed by a smaller virtual machine (the home appliance virtual machine) of the present embodiment that does not include the dynamic link function required by a conventional Java virtual machine. That is, the present embodiment utilizes the characteristic that link information included in Java bytecodes becomes unnecessary once the Java bytecodes reach a closed network environment (which are limited to specific users and purposes). This is because it is unnecessary to pay attention to collisions with unexpected programs during the delivery and execution of programs in a closed network environment.

Figure 11:
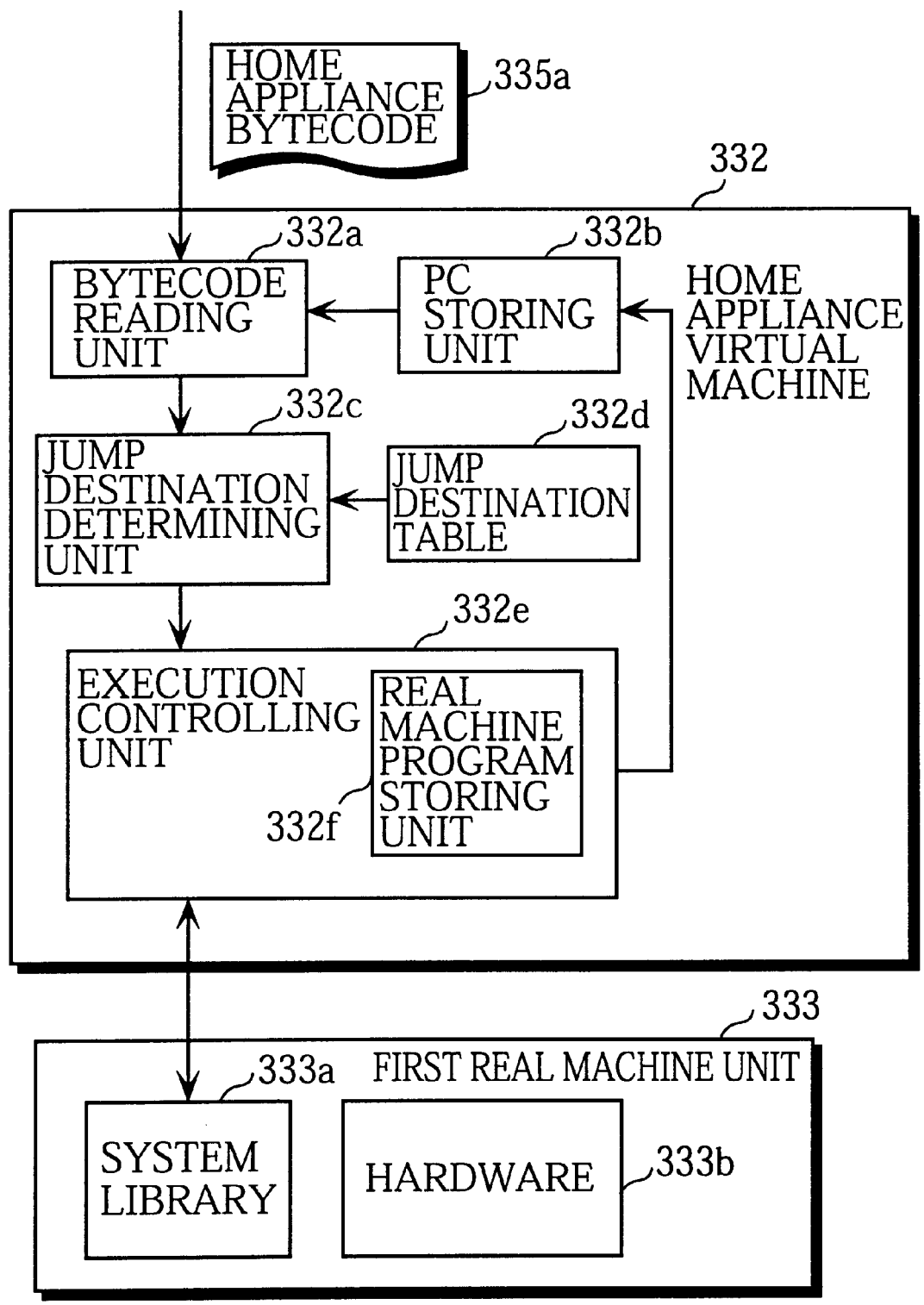
FIG. 11 is a functional block diagram showing the detailed constructions of the home appliance virtual machine and the first real machine unit of the TV tuner&home server.

FIG. 11 is a functional block diagram showing the detailed constructions of the home appliance virtual machine 332 and the first real machine unit 333 of the TV tuner&home server 330. As can be seen from FIGS. 10A and 10B, the home appliance virtual machine 332 equates to a conventional virtual machine from which a dynamic link apparatus has been eliminated, and includes a bytecode reading unit 332*a*, a PC storing unit 332*b*, a jump destination determining unit 332*c*, a jump destination table 332*d*, and an execution controlling unit 332*e*.

A real machine program storing unit 332*f* of the execution controlling unit 332*e* prestores real machine programs (programs which include instructions that are directly executed by the microprocessor of the first real machine unit 333). These real machine programs equate to microprograms for a general microprocessor and correspond to all types of home appliance bytecodes (operations) that are interpreted and executed by the home appliance virtual machine 332.

The jump destination table 332*d* is a table that gives a real machine program as a jump destination for each of all types of home appliance bytecodes. The jump destination of each home appliance bytecode specifies the first address of the corresponding real machine program in the real machine program storing unit 332*f*.

The PC storing unit 332*b* is a program counter of the home appliance virtual machine 332. The bytecode reading unit 332*a* sequentially reads one bytecode at a time from the home appliance bytecode 335*a* according to the address stored in the PC storing unit 332*b*. The jump destination determining unit 332*c* determines which real machine program corresponds to the operation of the home appliance bytecode sent from the bytecode reading unit 332*a* by referring to the jump destination table 332*d*. The jump destination determining unit 332*c* then informs the execution controlling unit 332*e* of the corresponding real machine program as a jump destination, together with additional information (such as operands included in the home appliance bytecode).

The execution controlling unit 332*e* transfers the execution control of hardware 333*b* (a microprocessor) of the first real machine 333 to a program indicated by the jump destination determining unit 332c, which is to say a real machine program in the real machine program storing unit 332f and operands. By doing so, the execution controlling unit 332e executes the execution cycle corresponding to each home appliance bytecode. When doing so, if the real machine program includes a statement that calls the system library 333a, the execution controlling unit 332e also transfers the execution control of the microprocessor of the first real machine 333 to the corresponding processing program in the system library 333a.

In this manner, the home appliance virtual machine 332 sequentially reads bytecodes of the home appliance bytecode 335a, determines a real machine program corresponding to the home appliance bytecode as a jump destination, and transfers the execution control of the first real machine unit 333 to the jump destination. The home appliance virtual machine 332 repeatedly performs this operation for each home appliance to bytecode. Note that each home appliance apart from the TV tuner&home server 330 is also equipped with a home appliance virtual machine and a real machine unit having the constructions shown in FIG. 11. For instance, the home appliance virtual machine 311 and the second real machine unit 311 of the DVD server 310 have the same constructions as the home appliance virtual machine 332 and the first real machine unit 333 of the TV tuner&home server 330. This is because the home appliance virtual machine 311 and the home appliance virtual machine 332 differ only in their object codes. That is, the home appliance virtual machine 311 (a program) is written using native codes for the second real machine unit 312 and the home appliance virtual machine 332 (another program) is written using native codes for the first real machine unit 333. Therefore, these home appliance virtual machines are identical with regard to the function of sequentially reading bytecodes of each home appliance bytecode, determining real machine programs corresponding to the home appliance bytecode as jump destinations, and transferring an execution control to the jump destinations.

Figure 12:
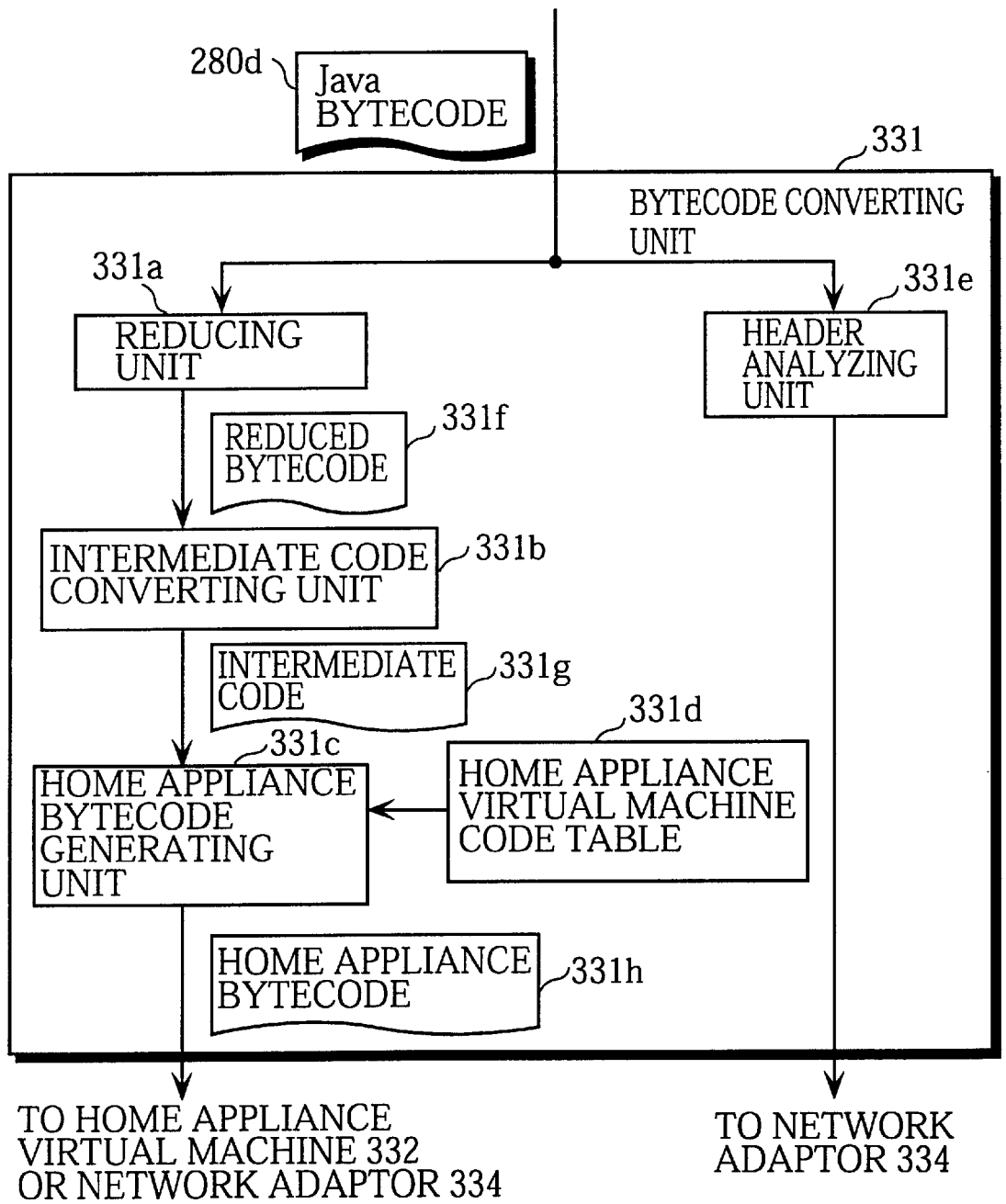
FIG. 12 is a functional block diagram showing the detailed construction of the bytecode converting unit of the TV tuner&home server of the second embodiment.

FIG. 12 is a functional block diagram showing the detailed construction of the bytecode converting unit 331 of the TV tuner&home server 330. The bytecode converting unit 331 can be broadly divided into two processing parts, which is to say a preprocessing part and a language converting part. The preprocessing part includes a reducing unit 331a and reduces the size of the inputted Java bytecode 280d. The language converting part includes an intermediate code converting unit 331d, a home appliance bytecode generating unit 331c, and a home appliance virtual machine code table 331d, and converts the reduced bytecode 331f obtained by reducing the size of the Java bytecode 280d into home appliance bytecode 331h that can be executed by any of the home appliances 300, 310, 320, and 330. That is, the language converting part converts Java bytecodes for Java virtual machines into home appliance bytecodes for the home appliance virtual machine.

Figure 13:
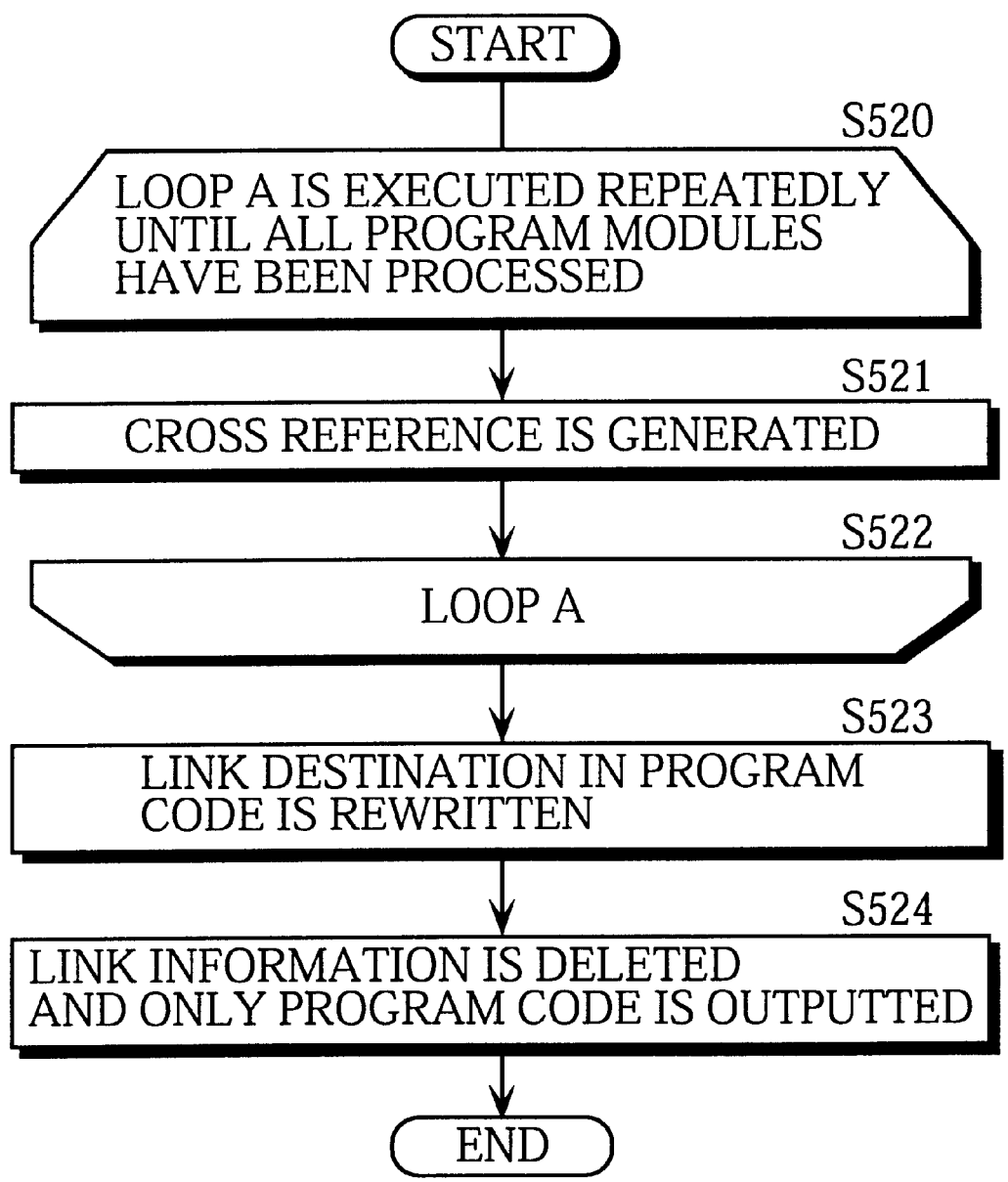
FIG. 13 is a flowchart showing the operation procedure of the reducing unit of the bytecode converting unit shown in FIG. 12.

FIG. 13 is a flowchart showing the operation procedure of the reducing unit 331a. As shown in this flowchart, the reducing unit 331a generates a cross reference table showing the reference relations between all program modules included in the Java bytecode 280d by referring to the link information in the program modules (steps S520–S522). More specifically, the reducing unit 331a specifies the destination module referred to by each source module included in the inputted Java bytecode 280d by sequentially tracing the symbols referred to by the source module. Note that the source module means a program module that refers to another program module and the destination module means a program module referred to by another program module. The reducing unit 331a then generates a table giving a pair of information concerning the source module (its program module name and variable names, and the location of the bytecode referring to the destination module) and information concerning the destination module (its program module name and variable names, and the location of the bytecode referred to by the source program module). That is, the reducing unit 331a eliminates intermediate references and indirect references from the Java bytecode 280d and generates a cross reference table that only shows direct references. Therefore, the cross reference table shows the specific location of a bytecode in a destination module referred to by a source module and the specific location of a bytecode in the source module referring to the destination module.

The reducing unit 331a then refers to the cross reference table and changes the objects referred to by (linked with) each source module into a destination module registered in the cross reference table (step S523). That is, the reducing unit 331a rewrites indirect references between program modules into direct references.

Because this operation makes the link information included in the Java bytecode 280d unnecessary, the reducing unit 331a extracts the part of each program module that is not link information, which is to say the part of each program module that equates to program code, and outputs the extracted part to the intermediate code converting unit 331d as the reduced bytecode 331f (step S524).

The intermediate code converting unit 331d is the same as the intermediate code converting unit of a general cross assembler. The intermediate code converting unit 331d generates an intermediate code 331g by lexically analyzing the inputted reduced bytecode 331f, converting the reduced bytecode 331f into an internal representation in a binary tree form, and performing optimization and the allocation of resources.

The home appliance virtual machine code table 331d prestores correspondence between home appliance bytecodes and all the different types of intermediate codes that can be generated by the intermediate code converting unit 331b.

The home appliance bytecode generating unit 331c has the same basic functions as the object code generating unit of a general cross assembler. The home appliance bytecode generating unit 331c converts the intermediate code 331g generated by the intermediate code converting unit 331d into code for a specific microprocessor (a home appliance virtual machine) by referring to the home appliance virtual machine code table 331d.

The header analyzing unit 331e controls the network adaptor 334 so that the home appliance bytecode 331h generated by the bytecode converting unit 331 is transferred to the target appliance. When doing so, the header analyzing unit 331e refers to the manufacturer's name, the device type, and the model name contained in the header part of the inputted Java bytecode 280d. As a result, the home appliance bytecode 331h generated by the bytecode converting unit 331 is supplied to the target appliance and is executed by the home appliance virtual machine running on the target appliance. Note that when the target appliance is the TV tuner&home server 330, the bytecode converting unit 331 directly supplies the home appliance bytecode 335a to the home appliance virtual machine 332 which then executes the home appliance bytecode 335a.

The following is a description of the operation of the present program cooperative execution system having the stated construction.

Figure 14:
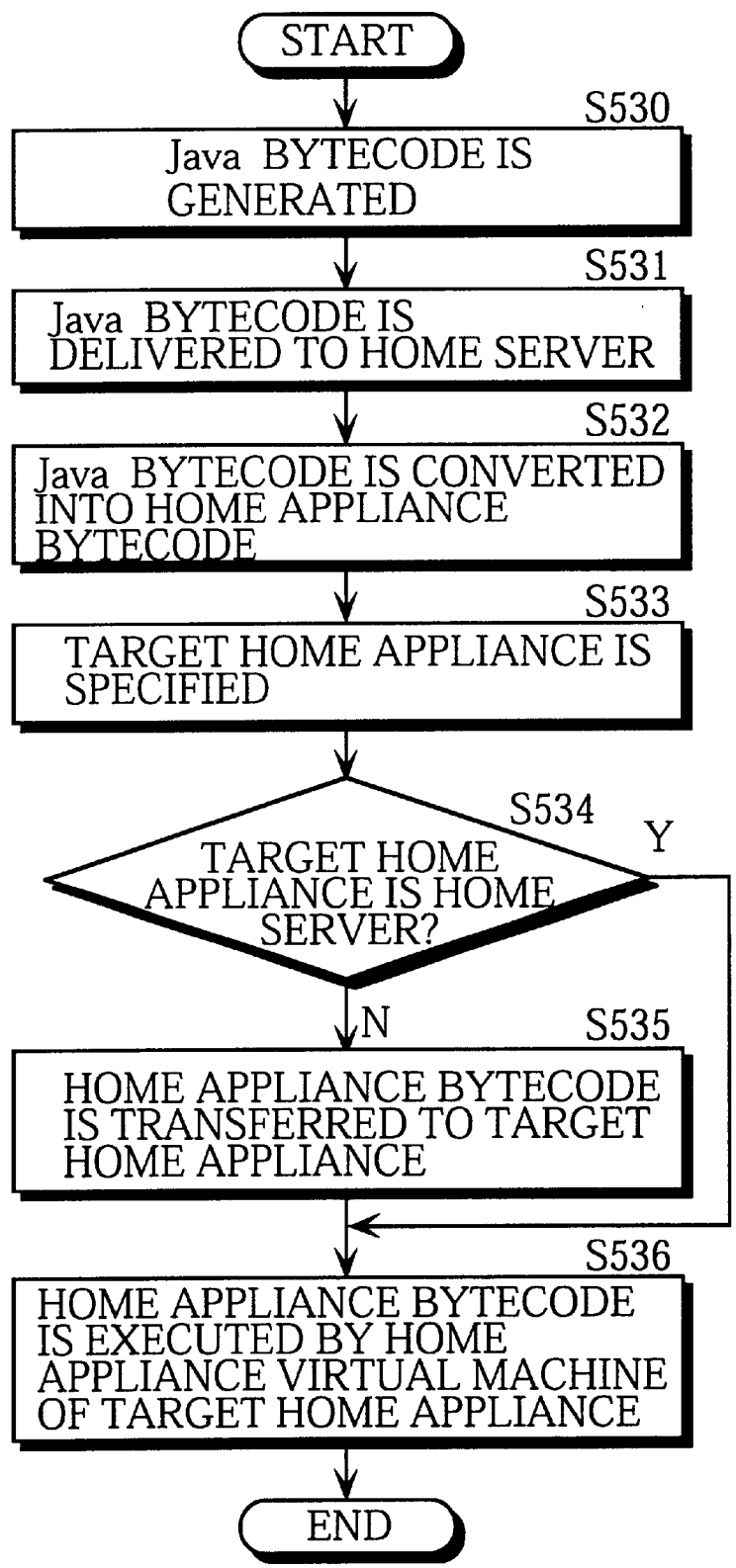
FIG. 14 is a flowchart showing the operation procedure of the program cooperative execution system of the second embodiment.

FIG. 14 is a flowchart showing the operation procedure of the present system.

Java bytecode for having a home appliance perform a cooperative operation is generated by the development computer 210 and is delivered to the TV tuner&home server 330 provided in the home 230 via the communications satellite 220 (steps S530 and S531). The bytecode converting unit 331 of the TV tuner&home server 330 then converts this Java bytecode into the home appliance bytecode 335a (step S532). At the same time, the bytecode converting unit 331 determines which home appliance is the target appliance by referring to the header part of the Java bytecode (step S533).

When the target appliance is the TV tuner&home server 330, the bytecode converting unit 331 transfers the home appliance bytecode 335a to the home appliance virtual machine 332 of the TV tuner&home server 330 (steps S534 and S536). On the other hand, when the target appliance is another home appliance (the DVD server 310, for instance), the bytecode converting unit 331 controls the network adaptor 334 so that the home appliance bytecode 335a is transferred to the DVD server 310 via the domestic AV network 350 and the network adaptor 313 (steps S534 and S535). Then, the home appliance virtual machine of the target appliance executes the transferred home appliance bytecode 335a (step S536).

In this manner, the TV tuner&home server 330 generates the home appliance bytecode 335a by deleting the link information that is not required by the domestic AV network from the Java bytecode 280a generated by the development computer 210. The TV tuner&home server 330 then transfers the home appliance bytecode 335a to a target appliance. The home appliance virtual machine of the target appliance executes this home appliance bytecode 335a. As a result, the present system achieves cooperative operations between the target appliance and the development computer 210 or between the target appliance and other home appliances.

Figure 15:
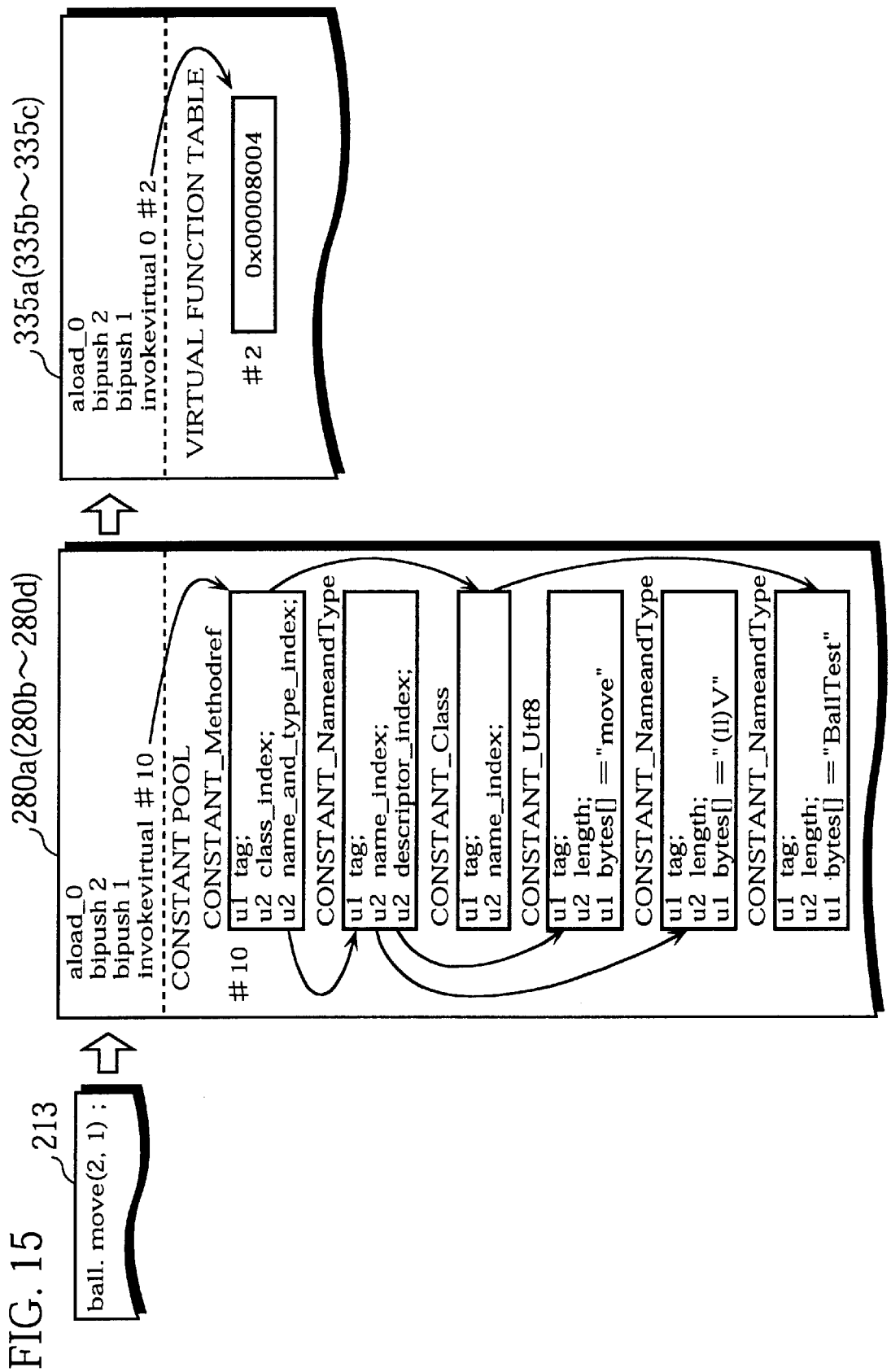
FIG. 15 shows example lists of an application program, byte code, and home appliance bytecode.

FIG. 15 shows actual examples of program lists of the application program 213, the Java bytecode 280a (280b–280d), and the home appliance bytecode 335a (335b–335c). This drawing only shows parts with the same processing contents. Note that the application program 213 and the Java bytecode 280a that are respectively shown at the left and center of this drawing are the same as those shown in FIG. 7. That is, the total size of the Java bytecode in a delivery form is 49 bytes.

The home appliance bytecode 335a shown at the right of FIG. 15 is generated by the bytecode converting unit 331 of the TV tuner&home server 330 to which the Java bytecode 280a is delivered via the communications satellite 220. This drawing shows four lines of program code and one virtual function table.

This program code includes a 1-byte instruction "aload_0" for preparing for a virtual function call, two 3-byte instructions "bipush" for passing arguments, and a 4-byte instruction "invokevirtual" for calling the virtual function. Therefore, the total size of this program code is 11 bytes. The virtual function table holds a 4-byte branch destination address. Accordingly, the total size of the home appliance bytecode 335a is 15 bytes.

The lengthy Java bytecode 280a in a delivery form is delivered to the home 230, is converted into the reduced home appliance bytecode 335a (335b–335c) from which redundancies are eliminated by the TV tuner&home server 330, and is downloaded into and executed by a target appliance provided in the home.

In the present system, each home appliance connected to the domestic AV network 350 effectively executes Java bytecodes using its home appliance virtual machine that is smaller than a conventional virtual machine (the Java virtual machine). Also, the home appliance bytecodes that are downloaded into home appliances are smaller than the Java bytecodes having the same contents. Accordingly, the present program cooperative execution system is suitable for home appliances, which include low-throughput microprocessors and real memories having small capacities in comparison with standard computer systems. However, each home appliance of the present embodiment still includes a home appliance virtual machine and can execute home appliance bytecodes. Therefore, the present system is suited to home appliances whose performances are higher than those of the home appliances in the first embodiment.

Third Embodiment

The program cooperative execution system of the present embodiment equates to a modification of the second embodiment. These embodiments are alike in that home appliances include home appliance virtual machines, but differ in that the closed network environment of the present embodiment for transferring home appliance bytecodes is a WAN owned by a utility, such as an electric-power company. The following description only concerns this difference.

Figure 16:
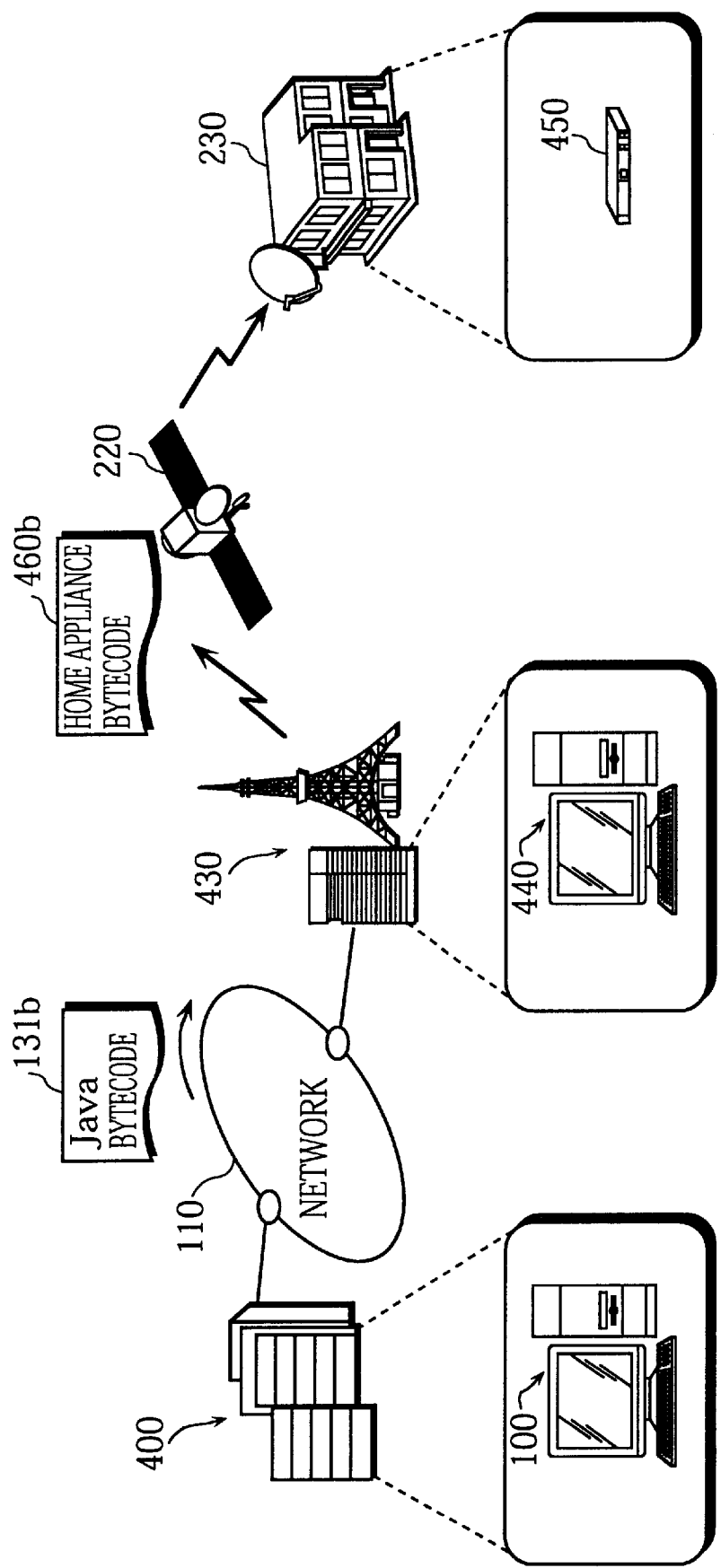
FIG. 16 is a block diagram showing the construction of the program cooperative execution system of the third embodiment.

FIG. 16 is a block diagram showing the construction of the program cooperative execution system of the present embodiment. The present system includes the development computer 100 that is provided in a company 400 where application programs (Java bytecodes) for having home appliances perform cooperative operations are developed, a network 110 such as the Internet for delivering the application programs to an electric-power company 430, a home appliance bytecode generating computer 440 provided in the electric-power company 430, the communications satellite 220 that constitutes a satellite communication network which is the property of the electric-power company 430 and is used to deliver home appliance bytecodes to the home 230, and a TV tuner&home server 450 that is provided in the home 230 and is a target of cooperative operations. That is, in the present system, the open network 110 is combined with the closed satellite communication network. The open network 110 equates to the conventional network shown in FIG. 1 and is used to deliver Java bytecode 131b. The closed satellite communication network is used to deliver home appliance bytecode 460b.

Figure 17B:
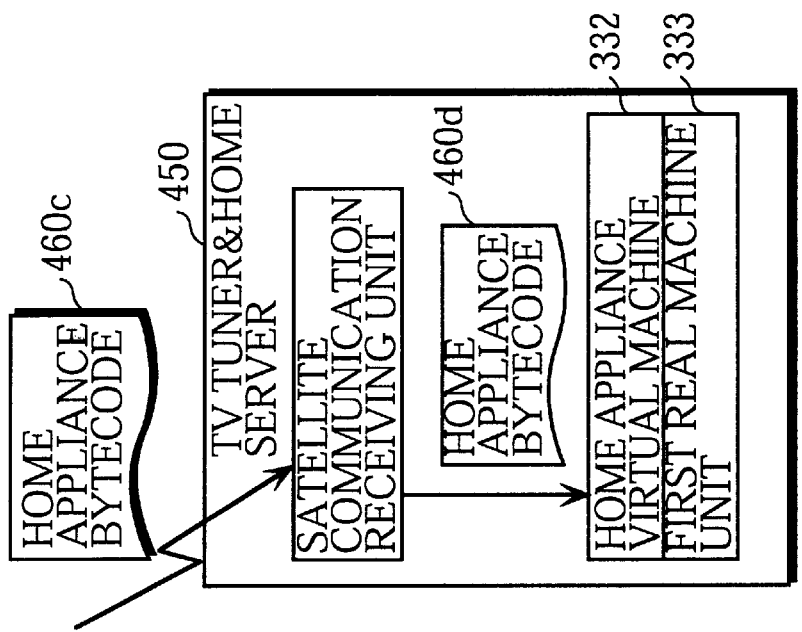
FIG. 17B is a functional block diagram showing the construction of the TV tuner&home server shown in FIG. 16.
Figure 17A:
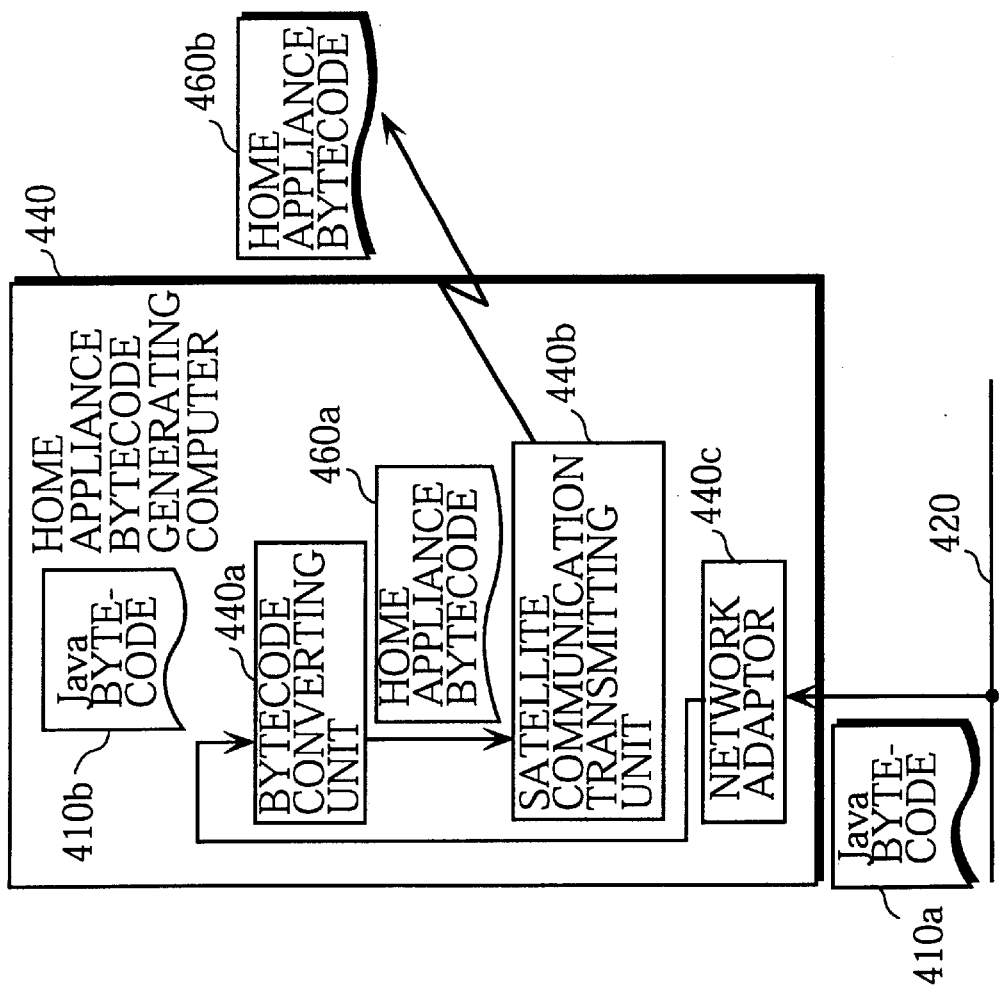
FIG. 17A is a functional block diagram showing the construction of the home appliance bytecode generating computer shown in FIG. 16.

FIG. 17A is a functional block diagram showing the construction of the home appliance bytecode generating computer 440 shown in FIG. 16. FIG. 17B is a functional block diagram showing the construction of the TV tuner&home server 450 shown in FIG. 16. The home appliance bytecode generating computer 440 functions as a server for delivering home appliance bytecodes to home appliances. Also, the home appliance bytecode generating computer 440 has the same functions as the bytecode converting unit 331 of the TV tuner&home server 330 of the second embodiment. That is, the home appliance bytecode generating computer 440 includes a bytecode converting unit 440a for converting Java bytecode 410b delivered from the development computer 100 into home appliance bytecode 460a. The home appliance bytecode generating computer delivers the home appliance bytecode 460a to the home 230 via a satellite communication transmitting unit 440b and the communications satellite 220.

The TV tuner&home server 450 of the present system is a target appliance and equates to the DVD server 310 of the second embodiment that includes a home appliance virtual machine.

In the present system having this construction, programs for having home appliances perform cooperative operations are delivered in a delivery form (Java bytecodes) suitable for secure operations in the open network 110, and are delivered in a reduced delivery form (home appliance bytecodes that do not include link information) in the closed network where secure program delivery does not need to be strictly ensured. Therefore, the present system is suitable for electrical appliances, such as home appliances, that include low-throughput microprocessors and real memories having small capacities in comparison with computer systems.

The program cooperative execution system to which the present invention is applied has been described above by means of the embodiments, although it should be obvious that the present invention is not limited to the examples described above. Further variations are described below.

In the first and second embodiments, the bytecode converting units 272 and 331 are respectively provided in the TV tuner&home servers 270 and 330. However, the bytecode converting units may be separated from the TV tuner&home servers and provided as independent apparatuses. For instance, the bytecode converting units may be standalone converting apparatuses connected to the domestic home appliance network 290 or the domestic AV network 350 and a public telephone network. The standalone converting apparatuses receive Java bytecodes delivered via the public telephone network, convert the Java bytecodes into native codes for real machines of target appliances or home appliance bytecodes for home appliance virtual machines of target appliances, and deliver the native codes or the home appliance bytecodes to the target appliances.

Also, in the first embodiment, the header analyzing unit 272b determines which real machine table corresponds to the Java bytecode 280d by referring to the real machine type contained in the header part of the Java bytecode 280d. However, when doing so, the header analyzing unit 272b may indirectly determine the corresponding real machine table by referring to information (such as the device type or the model name) about the target appliance contained in the header part. In this case, the bytecode converting unit 272 prestores a table showing the correspondence between device types or model names of a plurality of home appliances and real machine types of the plurality of home appliances. The header analyzing unit 272b determines which real machine table corresponds to the Java bytecode 280d by referring to this table according to the information in the header part.

Furthermore, in the second embodiment, the home appliances 300, 310, 320, and 330 connected to the domestic AV network 350 include identical home appliance virtual machines. However, these home appliances may include different types of home appliance virtual machines. For instance, three types of home appliance virtual machines may be designed to execute different instruction sets that are dedicated to the architectures of different types of real machines and such home appliance virtual machines may be provided in home appliances. These home appliance virtual machines are alike in that they execute reduced bytecodes which do not include link information but differ in that they execute instructions dedicated to the architectures of the corresponding real machines. In this case, the TV tuner&home server 330 of the second embodiment converts the Java bytecode 280c into home appliance bytecode corresponding to the type of the target appliance, like the TV tuner&home server 270 of the first embodiment that converts the Java bytecode 280c into native code corresponding to the target appliance.

Also, in the embodiments, the bytecode converting units and the home appliance virtual machines of the present invention are realized using specialized hardware (logic circuits). However, the bytecode converting units and the home appliance virtual machines may be realized by programs that can be executed by general-purpose microprocessors. Accordingly, programs for realizing the program cooperative execution apparatus of the present invention may be recorded on recording media, such as CD-ROMs, and distributed. Such programs may alternatively be distributed electronically.

What is claimed is:

1. An apparatus for having a plurality of electrical appliances perform cooperative operations specified by programs sent from a transmitting device, each of the plurality of electrical appliances being provided with a processor, the apparatus being connected to the transmitting device via a first communication channel and being connected to the plurality of electrical appliances via a second communication channel, the apparatus comprising:

a receiving means for receiving a first bytecode for a first virtual machine, the first bytecode being a program sent from the transmitting device via the first communication channel and specifying a cooperative operation;

an appliance specifying means for specifying an electrical appliance that should execute the received first bytecode, out of the plurality of electrical appliances;

a converting means for converting the received first bytecode into program code for a processor provided in the specified electrical appliance; and a distributing means for distributing the program code generated by the converting means to the specified electrical appliance via the second communication channel.

2. The apparatus of claim 1, wherein the processor provided in each of the plurality of electrical appliances is a real machine, the converting means converts the received first bytecode into native code of a real machine provided in the specified electrical appliance, and the distributing means distributes the native code generated by the converting means to the specified electrical appliance via the second communication channel.

3. The apparatus of claim 2, wherein the receiving means receives header information together with the first bytecode, the header information relating to a destination of the received first bytecode, and the appliance specifying means specifies the electrical appliance according to the header information.

4. The apparatus of claim 3, wherein the converting means includes:

a plurality of conversion tables which each correspond to one of the plurality of electrical appliances, each conversion table showing which instructions in native codes of a real machine of a corresponding electrical appliance correspond to each instruction in first bytecodes; and a code converting unit for converting the received first bytecode into the native code of the real machine provided in the specified electrical appliance by referring to a conversion table corresponding to the specified electrical appliance.

5. The apparatus of claim 1, wherein the processor provided in each of the plurality of electrical appliances is a second virtual machine, the converting means converts the received first bytecode into a second bytecode for a second virtual machine provided in the specified electrical appliance, and the distributing means distributes the second bytecode generated by the converting means to the specified electrical appliance via the second communication channel.

6. The apparatus of claim 5, wherein each first bytecode for the first virtual machine includes additional information that is used to dynamically link a plurality of program modules included in the first bytecode, and the converting means generates the second bytecode by linking the plurality of program modules according to the additional information included in the received first bytecode, wherein the second bytecode does not include the additional information.

7. The apparatus of claim 1, wherein the first communication channel is an open network that is open to any users, and the second communication channel is a closed network that is limited to specific users who meet a certain condition.

8. A program cooperative execution method used by an apparatus for having a plurality of electrical appliances perform cooperative operations specified by programs sent from a transmitting device, each of the plurality of electrical appliances being provided with a processor, the apparatus being connected to the transmitting device via a first communication channel and being connected to the plurality of electrical appliances via a second communication channel, the program cooperative execution method comprising:

a receiving step for receiving a first bytecode for a first virtual machine, the first bytecode being a program sent from the transmitting device via the first communication channel and specifying a cooperative operation;

an appliance specifying step for specifying an electrical appliance that should execute the received first bytecode, out of the plurality of electrical appliances;

a converting step for converting the received first bytecode into program code for a processor provided in the specified electrical appliance; and a distributing step for distributing the program code generated in the converting step to the specified electrical appliance via the second communication channel.

9. The program cooperative execution method of claim 8, wherein the processor provided in each of the plurality of electrical appliances is a real machine, in the converting step, the received first bytecode is converted into native code of a real machine provided in the specified electrical appliance, and in the distributing step, the native code generated in the converting step is distributed to the specified electrical appliance via the second communication channel.

10. The program cooperative execution method of claim 8, wherein the processor provided in each of the plurality of electrical appliances is a second virtual machine, in the converting step, the received first bytecode is converted into a second bytecode for a second virtual machine provided in the specified electrical appliance, and in the distributing step, the second bytecode generated in the converting step is distributed to the specified electrical appliance via the second communication channel.

11. A computer-readable recording medium for recording a control program to be executed by an apparatus that has a plurality of electrical appliances perform cooperative operations specified by programs sent from a transmitting device, each of the plurality of electrical appliances being provided with a processor, and the apparatus being connected to the transmitting device via a first communication channel and being connected to the plurality of electrical appliances via a second communication channel, the control program comprising:

a receiving step for receiving a first bytecode for a first virtual machine, the first bytecode being a program sent from the transmitting device via the first communication channel and specifying a cooperative operation;

an appliance specifying step for specifying an electrical appliance that should execute the received first bytecode, out of the plurality of electrical appliances;

a converting step for converting the received first bytecode into program code for a processor provided in the specified electrical appliance; and a distributing step for distributing the program code generated in the converting step to the specified electrical appliance via the second communication channel.

12. The recording medium of claim 11, wherein the processor provided in each of the plurality of electrical appliances is a real machine, in the converting step, the received first bytecode is converted into native code of a real machine provided in the specified electrical appliance, and in the distributing step, the native code generated in the converting step is distributed to the specified electrical appliance via the second communication channel.

13. The recording medium of claim 11, wherein the processor provided in each of the plurality of electrical appliances is a second virtual machine, in the converting step, the received first bytecode is converted into a second bytecode for a second virtual machine provided in the specified electrical appliance, and in the distributing step, the second bytecode generated in the converting step is distributed to the specified electrical appliance via the second communication channel.

14. A program cooperative execution system comprising:

a transmitting device;

a plurality of electrical appliances; and a relaying apparatus for having the plurality of electrical appliances perform cooperative operations specified by programs sent from the transmitting device, each of the plurality of electrical appliances being provided with a processor, the relaying apparatus being connected to the transmitting device via a first communication channel and being connected to the plurality of electrical appliances via a second communication channel, wherein the transmitting device comprises:

a generating means for generating a bytecode for a first virtual machine from a source program; and a transmitting means for transmitting the generated bytecode to the relaying apparatus via the first communication channel, the relaying apparatus comprises:
- a receiving means for receiving the bytecode sent from the transmitting device via the first communication channel;
- an appliance specifying means for specifying an electrical appliance that should execute the received bytecode, out of the plurality of electrical appliances;
- a converting means for converting the received bytecode into program code for a processor provided in the specified electrical appliance; and
- a distributing means for distributing the program code generated by the converting means to the specified electrical appliance via the second communication channel, and each of the plurality of electrical appliances comprises:
  - a receiving means for receiving the generated program code from the relaying apparatus via the second communication channel; and
  - a processor for executing the received program code.

* * * * *